(12) United States Patent
Abedini et al.

(10) Patent No.: US 11,818,666 B2
(45) Date of Patent: Nov. 14, 2023

(54) POWER CONFIGURATION OF SELF-INTERFERENCE MEASUREMENT

(71) Applicant: QUALCOMM Incorporated, San Diego, CA (US)

(72) Inventors: Navid Abedini, Basking Ridge, NJ (US); Junyi Li, Fairless Hills, PA (US); Kapil Gulati, Belle Mead, NJ (US); Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/357,371

(22) Filed: Jun. 24, 2021

(65) Prior Publication Data

US 2022/0022142 A1 Jan. 20, 2022

Related U.S. Application Data

(60) Provisional application No. 63/052,916, filed on Jul. 16, 2020.

(51) Int. Cl.
*H04W 52/24* (2009.01)
*H04B 17/19* (2015.01)

(52) U.S. Cl.
CPC .......... *H04W 52/243* (2013.01); *H04B 17/19* (2015.01)

(58) Field of Classification Search
CPC .............................. H04W 52/243; H04B 17/19
See application file for complete search history.

(56) References Cited

U.S. PATENT DOCUMENTS

2007/0149126 A1* 6/2007 Rangan ................ H04B 17/336
455/63.1
2018/0248677 A1* 8/2018 Lee ........................ H04L 5/0062
(Continued)

FOREIGN PATENT DOCUMENTS

EP 3343857 A1 7/2018

OTHER PUBLICATIONS

Agilent Technologies: "Verification of Self-Interference Capability for the Radiated Second Stage of The Two-Stage Method", 3GPP Draft, 3GPP TSG RAN WG4 #68, R4-134249, 3rd Generation Partnership Project (3GPP), Mobile Competence Centre, 650, Route Des Lucioles, F-06921 Sophia-Antipolis Cedex, France, vol. RAN WG4, No. Barcelona. Spain, Aug. 19, 2013-Aug. 23, 2013 Aug. 15, 2013 (Aug. 15, 2013), XP050721824, 3 Pages, Retrieved from the Internet: URL: http://www.3gpp.org/ftp/tsg_ran/WG4_Radio/TSGR4_68/Docs/ [retrieved on Aug. 15, 2013] Section 2.
(Continued)

*Primary Examiner* — Junpeng Chen
(74) *Attorney, Agent, or Firm* — Holland & Hart LLP

(57) ABSTRACT

Methods, systems, and devices for wireless communications are described. A user equipment (UE) may experience multiple types of self-interference (SI), perform interference measurement procedures, and may identify interference mitigation procedures. The UE may identify a configuration for performing SI measurements (SIMs), where the configuration indicates a first transmission power associated with a first transmission and a second transmission power associated with a second transmission, where the second transmission power is higher than the first transmission power. The UE may transmit the first transmission at the first transmission power and the second transmission at the second transmission power, where the first transmission is associated with a first repetition frequency and the second
(Continued)

transmission is associated with a second repetition frequency. The UE may measure SI based on transmitting the first transmission and the second transmission.

30 Claims, 15 Drawing Sheets

(56) References Cited

U.S. PATENT DOCUMENTS

2019/0260485 A1* 8/2019 Byun ................... H04B 17/336
2021/0376892 A1* 12/2021 Zhang .................. H04B 17/336
2022/0232481 A1* 7/2022 Kusashima ........... H04W 52/10

OTHER PUBLICATIONS

International Search Report and Written Opinion—PCT/US2021/039144—ISA/EPO—dated Oct. 22, 2021 (206055WO).

* cited by examiner

POWER CONFIGURATION OF SELF-INTERFERENCE MEASUREMENT

CROSS REFERENCE

The present application for patent claims the benefit of U.S. Provisional Patent Application No. 63/052,916 by Abedini et al., entitled "POWER CONFIGURATION OF SELF-INTERFERENCE MEASUREMENT," filed Jul. 16, 2020, assigned to the assignee hereof, and expressly incorporated by reference in its entirety herein.

FIELD OF TECHNOLOGY

The following relates to wireless communications, including power configuration of self-interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit a signal to one or more other wireless devices, such as a base station. In some cases, the UE may experience self-interference (SI), where the signal transmitted by the UE interferes with reception of other signals by the UE. For example, the transmitted signal may be reflected back to the UE by an object, which may be an example of clutter echo. In other cases, the transmitted signal may leak from a transmit antenna of the UE to a receive antenna of the UE, which may be an example of near-field SI.

SUMMARY

The described techniques relate to improved methods, systems, devices, and apparatuses that support power configuration of self-interference measurement (SIM). Generally, the described techniques provide for a user equipment (UE) experiencing multiple types of self-interference (SI), performing interference measurement procedures, and identifying interference mitigation procedures. The UE may identify a configuration for performing SI measurements (SIMs), where the configuration indicates a first transmission power associated with a first transmission and a second transmission power associated with a second transmission, where the second transmission power is higher than the first transmission power. The UE may transmit the first transmission at the first transmission power and the second transmission at the second transmission power, where the first transmission is associated with a first repetition frequency and the second transmission is associated with a second repetition frequency. The UE may measure SI based on transmitting the first transmission and the second transmission.

A method of wireless communications at a wireless device including is described. The method may include identifying a configuration for performing SIM, where the configuration indicates a first transmission power associated with a first transmission and a second transmission power associated with a second transmission, where the second transmission power is higher than the first transmission power, transmitting the first transmission at the first transmission power and the second transmission at the second transmission power, where the first transmission is associated with a first repetition frequency and the second transmission is associated with a second transmission frequency, and measuring SI based on transmitting the first transmission and the second transmission.

An apparatus for wireless communications at a wireless device including is described. The apparatus may include a processor, memory coupled with the processor, and instructions stored in the memory. The instructions may be executable by the processor to cause the apparatus to identify a configuration for performing SIM, where the configuration indicates a first transmission power associated with a first transmission and a second transmission power associated with a second transmission, where the second transmission power is higher than the first transmission power, transmit the first transmission at the first transmission power and the second transmission at the second transmission power, where the first transmission is associated with a first repetition frequency and the second transmission is associated with a second repetition frequency, and measure SI based on transmitting the first transmission and the second transmission.

Another apparatus for wireless communications at a wireless device including is described. The apparatus may include means for identifying a configuration for performing SIM, where the configuration indicates a first transmission power associated with a first transmission and a second transmission power associated with a second transmission, where the second transmission power is higher than the first transmission power, transmitting the first transmission at the first transmission power and the second transmission at the second transmission power, where the first transmission is associated with a first repetition frequency and the second transmission is associated with a second repetition frequency, and measuring SI based on transmitting the first transmission and the second transmission.

A non-transitory computer-readable medium storing code for wireless communications at a wireless device including is described. The code may include instructions executable by a processor to identify a configuration for performing SIM, where the configuration indicates a first transmission power associated with a first transmission and a second transmission power associated with a second transmission, where the second transmission power is higher than the first transmission power, transmit the first transmission at the first transmission power and the second transmission at the second transmission power, where the first transmission is associated with a first repetition frequency and the second transmission is associated with a second repetition frequency, and measure SI based on transmitting the first transmission and the second transmission.

Some examples of the method, apparatuses, and non-transitory computer-readable medium described herein may further include operations, features, means, or instructions for detecting the second type of SI using the second transmission transmitted with the second transmission power, and identifying a third transmission power different than the second transmission power based on the detected second type of SI.

Some examples of the method, apparatuses, and non-transitory computer-readable medium described herein may further include operations, features, means, or instructions for transmitting one or more third transmissions using the third transmission power in one or more subsequent SIM occasions.

Some examples of the method, apparatuses, and non-transitory computer-readable medium described herein may further include operations, features, means, or instructions for performing a measurement process or mitigation process for the second type of SI based on transmitting the one or more third transmissions.

Some examples of the method, apparatuses, and non-transitory computer-readable medium described herein may further include operations, features, means, or instructions for transmitting a report including an indication of the detected second type of SI, and receiving configuration information for the third transmission power, where identifying the third transmission power may be based on receiving the configuration information.

Some examples of the method, apparatuses, and non-transitory computer-readable medium described herein may further include operations, features, means, or instructions for determining the third transmission power, and transmitting an indication of the determined third transmission power.

Some examples of the method, apparatuses, and non-transitory computer-readable medium described herein may further include operations, features, means, or instructions for receiving an indication of a confirmation of the third transmission power, where identifying the third transmission power may be based on receiving the indication of the confirmation of the third transmission power.

In some examples of the method, apparatuses, and non-transitory computer-readable medium described herein, identifying the configuration for performing SIMs may include operations, features, means, or instructions for receiving configuration information including an indication of the first transmission power and the second transmission power.

In some examples of the method, apparatuses, and non-transitory computer-readable medium described herein, identifying the configuration for performing SIMs may include operations, features, means, or instructions for determining at least the first transmission power or the second transmission power of the configuration for performing SIMs.

Some examples of the method, apparatuses, and non-transitory computer-readable medium described herein may further include operations, features, means, or instructions for transmitting an indication of the determined first transmission power or second transmission power.

Some examples of the method, apparatuses, and non-transitory computer-readable medium described herein may further include operations, features, means, or instructions for identifying a common SIM object for a set of SIM occasions, where the common SIM object defines a common set of measurement parameters for the set of SIM occasions, applying the common set of measurement parameters and a first transmission power configuration corresponding to the first transmission power for a first subset of the set of SIM occasions, and applying the common set of measurement parameters and a second transmission power configuration corresponding to the second transmission power for a second subset of the set of SIM occasions.

Some examples of the method, apparatuses, and non-transitory computer-readable medium described herein may further include operations, features, means, or instructions for identifying an association between the first transmission power configuration and the first subset of the set of SIM occasions and an association between the second transmission power configuration and the second subset of the set of SIM occasions based on a bitmap.

Some examples of the method, apparatuses, and non-transitory computer-readable medium described herein may further include operations, features, means, or instructions for identifying an association between the first transmission power configuration and the first subset of the set of SIM occasions and an association between the second transmission power configuration and the second subset of the set of SIM occasions based on a periodicity associated with the first subset and the second subset, or an offset between the first subset and the second subset, or a combination thereof.

Some examples of the method, apparatuses, and non-transitory computer-readable medium described herein may further include operations, features, means, or instructions for transmitting a first report including a first measurement result corresponding to the first subset of the set of SIM occasions, and transmitting a second report including a second measurement result corresponding to the second subset of the set of SIM occasions.

Some examples of the method, apparatuses, and non-transitory computer-readable medium described herein may further include operations, features, means, or instructions for identifying a set of separate SIM objects for a set of SIM occasions, where each of the set of SIM objects defines a set of measurement parameters for one or more of the set of SIM occasions.

In some examples of the method, apparatuses, and non-transitory computer-readable medium described herein, the first repetition frequency may be higher than the second repetition frequency.

In some examples of the method, apparatuses, and non-transitory computer-readable medium described herein, the first transmission may be for measuring a first type of the SI and the second transmission may be for measuring a second type of the SI.

In some examples of the method, apparatuses, and non-transitory computer-readable medium described herein, the first type of SI may be associated with near-field SI, and the second type of SI may be associated with reflection from an object.

In some examples of the method, apparatuses, and non-transitory computer-readable medium described herein, the first transmission indicates signal strength of the wireless device.

In some examples of the method, apparatuses, and non-transitory computer-readable medium described herein, the wireless device may be a UE, a base station, a distributed unit, a mobile terminal, or an integrated access and backhaul node.

A method of wireless communications at a network node is described. The method may include identifying a configuration for performing SIM, where the configuration indicates a first transmission power associated with a first transmission and a second transmission power associated with a second transmission, where the second transmission power is higher than the first transmission power, transmitting, to a wireless device, an indication of the configuration for performing SI, where the configuration indicates a first repetition frequency associated with the first transmission and a second repetition frequency associated with the second transmission, and receiving, from the wireless device, a measurement report including an indication of measured SI based on the configuration for performing SI.

An apparatus for wireless communications at a network node is described. The apparatus may include a processor, memory coupled with the processor, and instructions stored in the memory. The instructions may be executable by the processor to cause the apparatus to identify a configuration for performing SIM, where the configuration indicates a first transmission power associated with a first transmission and a second transmission power associated with a second transmission, where the second transmission power is higher than the first transmission power, transmit, to a wireless device, an indication of the configuration for performing SI, where the configuration indicates a first repetition frequency associated with the first transmission and a second repetition frequency associated with the second transmission, and receive, from the wireless device, a measurement report including an indication of measured SI based on the configuration for performing SI.

Another apparatus for wireless communications at a network node is described. The apparatus may include means for identifying a configuration for performing SIM, where the configuration indicates a first transmission power associated with a first transmission and a second transmission power associated with a second transmission, where the second transmission power is higher than the first transmission power, transmitting, to a wireless device, an indication of the configuration for performing SI, where the configuration indicates a first repetition frequency associated with the first transmission and a second repetition frequency associated with the second transmission, and receiving, from the wireless device, a measurement report including an indication of measured SI based on the configuration for performing SI.

A non-transitory computer-readable medium storing code for wireless communications at a network node is described. The code may include instructions executable by a processor to identify a configuration for performing SIM, where the configuration indicates a first transmission power associated with a first transmission and a second transmission power associated with a second transmission, where the second transmission power is higher than the first transmission power, transmit, to a wireless device, an indication of the configuration for performing SI, where the configuration indicates a first repetition frequency associated with the first transmission and a second repetition frequency associated with the second transmission, and receive, from the wireless device, a measurement report including an indication of measured SI based on the configuration for performing SI.

Some examples of the method, apparatuses, and non-transitory computer-readable medium described herein may further include operations, features, means, or instructions for receiving, from the wireless device, a report including an indication of a detected second type of the SI, and transmitting, to the wireless device, configuration information for a third transmission power.

Some examples of the method, apparatuses, and non-transitory computer-readable medium described herein may further include operations, features, means, or instructions for transmitting, to the wireless device, an indication of the determined third transmission power.

Some examples of the method, apparatuses, and non-transitory computer-readable medium described herein may further include operations, features, means, or instructions for receiving, from the wireless device, an indication of a confirmation of the third transmission power, where identifying the third transmission power may be based on receiving the indication of the confirmation of the third transmission power.

In some examples of the method, apparatuses, and non-transitory computer-readable medium described herein, the indication of the configuration includes a common periodic SIM object for a set of SIM occasions, where the common periodic SIM object defines a common set of measurement parameters for the set of SIM occasions.

Some examples of the method, apparatuses, and non-transitory computer-readable medium described herein may further include operations, features, means, or instructions for receiving, from the wireless device, a first report including a first measurement result corresponding to the first subset of the set of SIM occasions, and receiving, from the wireless device, a second report including a second measurement result corresponding to the second subset of the set of SIM occasions.

In some examples of the method, apparatuses, and non-transitory computer-readable medium described herein, the first repetition frequency may be higher than the second repetition frequency.

In some examples of the method, apparatuses, and non-transitory computer-readable medium described herein, the first transmission may be for measuring a first type of the SI and the second transmission may be for measuring a second type of the SI.

In some examples of the method, apparatuses, and non-transitory computer-readable medium described herein, the first type of SI may be associated with near-field SI, and the second type of SI may be associated with reflection from an object.

In some examples of the method, apparatuses, and non-transitory computer-readable medium described herein, the first transmission indicates signal strength of the wireless device.

In some examples of the method, apparatuses, and non-transitory computer-readable medium described herein, the wireless device may be a UE, a base station, a distributed unit, a mobile terminal, or an integrated access and backhaul node.

In some examples of the method, apparatuses, and non-transitory computer-readable medium described herein, the network node may be a UE, a base station, a distributed unit, a central unit, a mobile terminal, or an integrated access and backhaul node.

DETAILED DESCRIPTION

Figure 1:
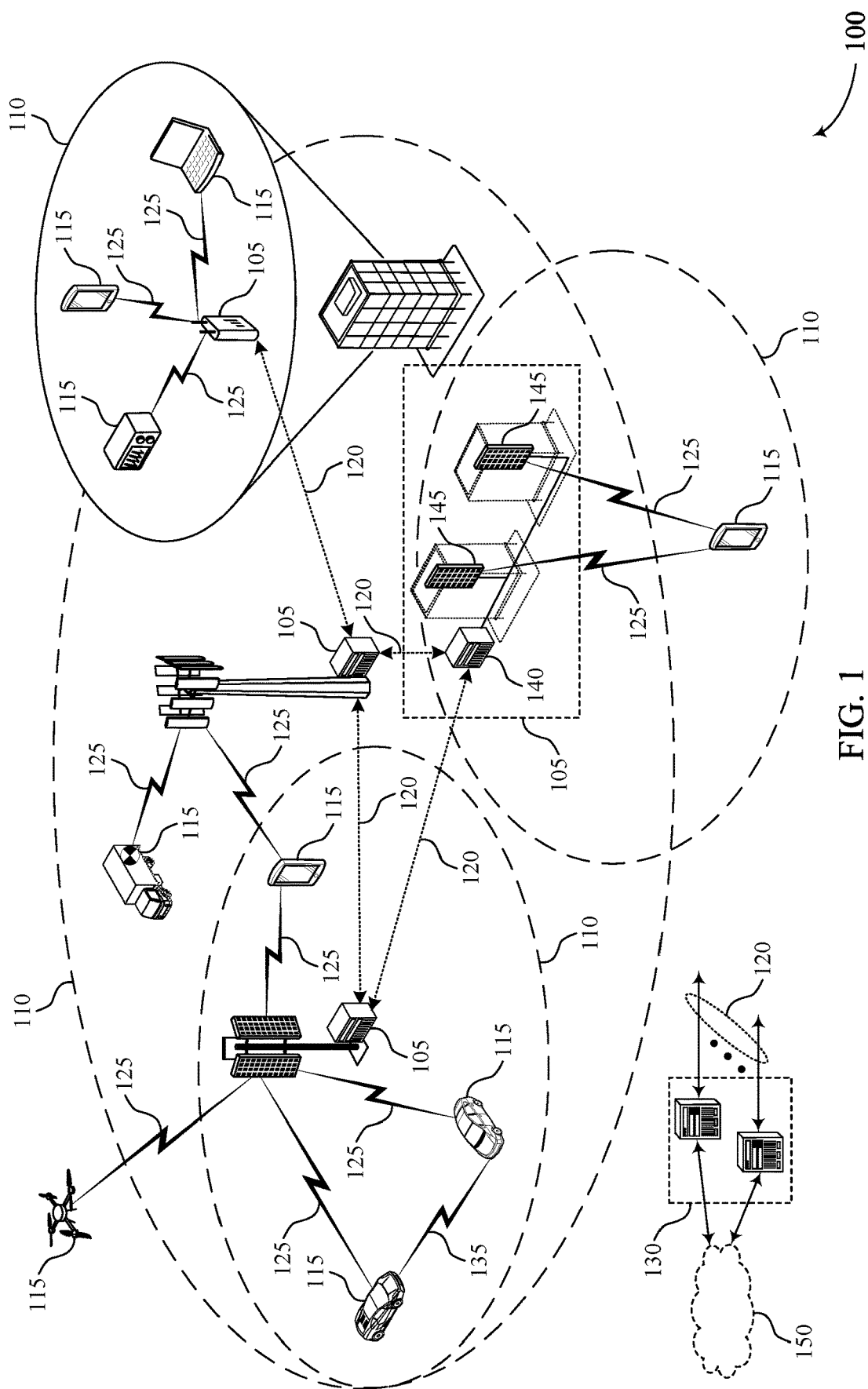
FIG. 1 illustrates an example of a wireless communications system that supports power configuration of self-interference measurement in accordance with aspects of the present disclosure.

A user equipment (UE) may communicate with one or more other wireless communications devices in a wireless communications system. The UE may transmit signals to other devices and receive signals from other devices. In some cases, the UE may operate in a full-duplex mode, where the UE may transmit signals and receive signals during the same set of resources, such as at the same time or over the same frequency, or both.

The UE may experience self-interference (SI). SI may occur when a signal transmitted by the UE interferes with the reception of other signals by the UE. In some cases, the UE may experience clutter echo, a type of SI where the signal transmitted by the UE is reflected back to the UE, and the reflected signal may interfere with reception of other signals by the UE. The reflected signal may interfere with a receive antenna or port of the UE. The signal may be reflected back to the UE by a physical object, which may, in some cases, be another wireless device. This SI may also be an example of far-field reflection. The transmitted signal may be partially or fully reflected. In other cases, the transmitted signal may leak from the transmit antenna or port of the UE to a receive antenna or port of the UE, and may thereby cause SI. This signal leakage may be an example of near-field SI, or near-field leakage.

A UE may perform SI measurement (SIM) in order to measure and mitigate causes of SI. To perform SIM, the UE may transmit a signal, and measure the SI caused by the signal. The transmitted signal may be a signal specifically for the purpose of SIM, or may be another type of signal, such as a control or data signal. The UE may determine a transmission power for transmission of the SIM signal. A low power may be sufficient for the UE to transmit the SIM signal for detection of near-field SI. The low power transmission may cause a lower level of interference with other ongoing communications at the UE or for other wireless devices in a system and may also use less power of the UE. However, the low power transmission may not reach far objects, and thus may be less useful for detection of clutter echo. As such, the UE may use a higher power for transmission of a SIM signal for detection of clutter echo. Further, in some cases, the UE may transmit a SIM signal which may also be used by other wireless devices. In these cases, the UE may also use a higher power for transmission of SIM signals.

The UE may thus perform SIM of near-field SI with a lower power, and perform SIM of clutter echo with a higher power. The UE may use a hybrid transmission power configuration to perform both SIMs. The transmission power configuration may include performing the near-field SIM with the lower power more often, and performing the clutter echo SIM with the higher power less often.

In some cases, the UE may identify the two power levels, as well as the repetition frequency of performing the SIM. In other cases, the UE may receive an indication from another wireless device, such as a base station, including the configuration of the two power levels, as well as the repetition frequency for each SIM. After performing one or both types of SIM, the UE may transmit a measurement report including the measurements. The UE may receive an indication of a new power level with which to perform transmissions, such that the measured SI is decreased or mitigated to a threshold level.

Further, the SIM configuration may include a common periodic SIM object. The common periodic SIM object may include a particular configuration of transmission powers for each type of SI, as well as repetition frequencies for transmitting the signals for each type of SI, and other parameters. There may be multiple different periodic SIM objects, which the UE may use to perform SIM.

Aspects of the disclosure are initially described in the context of wireless communications systems. Aspects of the disclosure are then described with respect to a process flow. Aspects of the disclosure are further illustrated by and described with reference to apparatus diagrams, system diagrams, and flowcharts that relate to power configuration of self-interference measurement.

FIG. 1 illustrates an example of a wireless communications system 100 that supports power configuration of self-interference measurement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may experience multiple types of SI, perform interference measurement procedures, and identify interference mitigation procedures. For example, the UE 115 may experience clutter echo that is caused by a signal transmitted by the UE 115 reflecting off of an object back to the UE 115 and causing interference at a receive antenna of the UE 115. The UE 115 may also experience interference caused by transmitted signals leaking into receive ports or antennas of the UE 115, which may cause near-field SI. The UE 115 may identify a configuration for performing SIMs, where the configuration indicates a first transmission power associated with a first transmission and a second transmission power associated with a second transmission. In some examples, the second transmission power is higher than the first transmission power. The UE 115 may transmit multiple signals, where each signal is for identifying different types of SI. For example, the UE 115 may transmit the first transmission at the first transmission power and the second transmission at the second transmission power, where the first transmission is associated with a first repetition frequency and the second transmission is associated with a second repetition frequency. The UE 115 may measure SI based on transmitting the first transmission and the second transmission.

Figure 2:
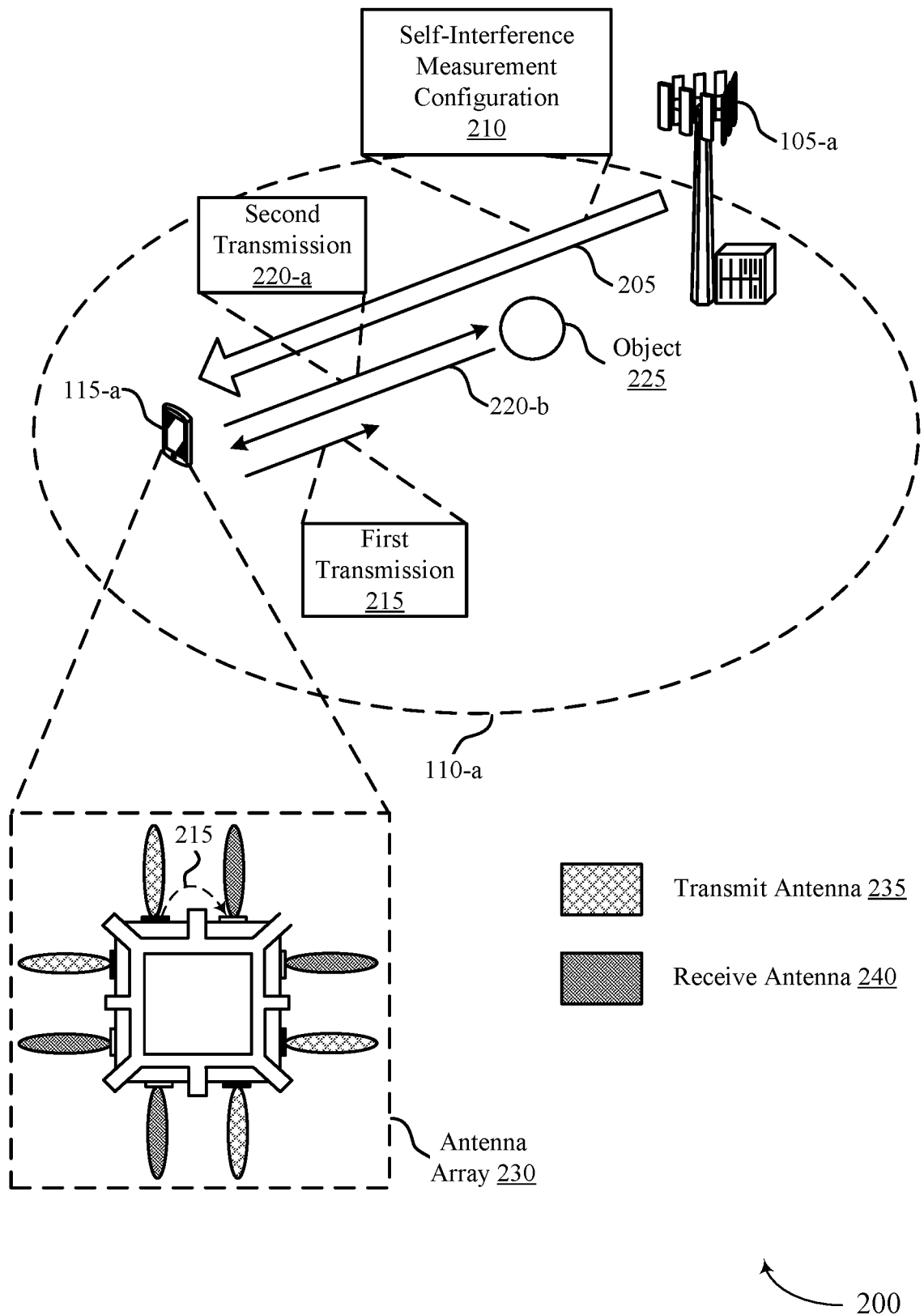
FIG. 2 illustrates an example of a wireless communications system that supports power configuration of self-interference measurement in accordance with aspects of the present disclosure.

FIG. 2 illustrates an example of a wireless communications system 200 that supports power configuration of self-interference measurement in accordance with aspects of the present disclosure. In some examples, wireless communications system 200 may implement aspects of wireless communication system 100. FIG. 2 includes UE 115-a, which may be an example of a UE 115 as described with respect to FIG. 1. FIG. 2 also includes base station 105-a, which may be an example of a base station 105 as described with respect to FIG. 1. Base station 105-a may serve one or more UEs 115 within coverage area 110-a. UE 115-a may be an example of an integrated access and backhaul (IAB) node, such as a mobile terminal (MT), a distributed unit (DU), or another child node. Base station 105-a may be an example of a network node, including an IAB node, such as a DU or a central unit (CU), or another parent node.

UE 115-a may include an antenna array 230. Antenna array 230 may include transmit antennas 235, which may include transmit beams. Antenna array 230 may also include receive antennas 240, which may include receive beams. UE 115-a may receive downlink transmissions from base station 105-a over channel 205. UE 115-a may receive downlink transmissions using receive antenna 240 (e.g., a beam of receive antenna 240). UE 115-a may transmit uplink transmission to base station 105-a. UE 115-a may transmit uplink transmissions using transmit antenna 235 (e.g., a beam of transmit antenna 235). In some cases, the uplink transmissions may be reflected back to a receive antenna 240 of UE 115-a. The reflected signals may interfere with reception of other signals (e.g., downlink signals from base station 105-a) and may thus cause SI.

UE 115-a may experience clutter echo and near-field SI. Clutter echo may include SI caused by reflection of a signal by an object. For example, UE 115-a may transmit a signal which may be reflected back to a receive antenna 240 by an object, such as object 225. Near-field SI may include signal leakage of a signal transmitted by a transmit antenna 235, where the transmitted signal may be detected by a receive antenna 240.

In order to mitigate SI, UE 115-a may perform SIM. UE 115-a may perform SIM with multiple power settings. UE 115-a may measure clutter echo SI using a high power signal, as the high power may be more likely to reach potential clutter-echo-causing objects, such as object 225. UE 115-a may measure near-field interference using a lower power signal, as a low power may be enough to detect near-field interference, while also avoiding interference with other ongoing transmissions. Thus, UE 115-a may transmit two different signals for SIM, where one signal is for SIM of clutter echo, and one signal is for measurement of near-field SI. In some cases, the signals may be transmitted specifically for the purposes of SIM, and in other cases, the signals may be transmitted for other primary purposes (e.g., other scheduled control or data signals), and the signals may also be used for SIM by UE 115-a.

UE 115-a may transmit first transmission 215 for measurement of near-field SI. UE 115-a may transmit first transmission 215 with a low power and may transmit first transmission 215 according to a first repetition frequency. The first repetition frequency may be a periodic or an aperiodic schedule according to which UE 115-a may repeat transmitting first transmission 215 for SIM of the near-field SI. After transmitting first transmission 215 with a transmit antenna 235 (e.g., as shown within antenna array 230), UE 115-a may receive the leaked signal with a receive antenna 240. UE 115-a may measure the SIM of the first transmission 215.

UE 115-a may transmit second transmission 220-a for measurement of clutter echo (e.g., caused by object 225), with a higher power, such that second transmission 220-a is more likely to reach and be reflected by an object. UE 115-a may transmit second transmission 220-a according to a second repetition frequency. In some cases, the first repetition frequency may be higher than the second repetition frequency. As such, UE 115-a may transmit first transmission 215 more often than second transmission 220-a. When transmitting second transmission 220-a, UE 115-a may receive reflected second transmission 220-b, in cases where second transmission 220-a is reflected by an object, such as object 225. UE 115-a may measure the SIM of the second transmission 220-a.

In some cases, UE 115-a may independently determine the power levels and repetition frequencies of transmissions 215 and 220-a. In other cases, base station 105-a may transmit SIM configuration 210, which may include an indication of the power levels, repetition frequencies, and other parameters of performing SIM. UE 115-a may receive SIM configuration 210, and may use the indicated parameters to transmit first transmission 215 and second transmission 220-a.

Based on measuring near-field SI with first transmission 215 and clutter echo with second transmission 220-a, UE 115-a may transmit a report of the detected interference to base station 105-a. Based on the report, base station 105-a may identify a transmission power for future transmissions by UE 115-a, such that the future transmissions may have a low likelihood of causing either type of SIM. The future transmissions may also include subsequent signals transmitted for the purposes of SIM, or may be other control and data signals. In other cases, UE 115-a may determine (e.g., without configuration information received from base station 105-a), based on the identified clutter echo, or near-field SI, or both, a transmission power for future transmissions by UE 115-a.

In some cases, UE 115-a may identify a common periodic SIM object. The common periodic SIM object may include multiple transmit power configurations (e.g., transmission powers for first transmission 215 and second transmission 220-a). The common periodic SIM object may indicate a different transmit power configuration that may be applied for different repetitions of transmitting first transmission 215 and second transmission 220-a. For example, the common periodic SIM object may indicate a first power level for a first repetition of the transmission of first transmission 215, a different power level for a second repetition of the transmission of first transmission 215, and then a return to the first power level for a third repetition of the transmission of first transmission 215. The same or a different common periodic SIM object may apply for second transmission 220-a. UE 115-a may follow the common periodic SIM object for second transmission 220-a, however there may be more time between repetitions of second transmission 220-a than first transmission 215.

The common periodic SIM objects may vary the power of each repetitions, but the transmissions resources, measurement procedure, transmit and receive beam configurations, and SIM reference signal configuration may remain the same for each different repetition. The association within the object of the different transmit power setting to SIM repetition may be indicate via a bitmap, an offset, a periodicity, or a combination thereof. The common periodic SIM object may also be associated with multiple reporting objects, where each reporting object may be associated with one or more instances of SIM repetitions (each with different transmit power settings). In some cases, UE 115-a may receive the common periodic SIM object in SIM configuration 210 from base station 105-b. In other cases, UE 115-a may determine the common periodic SIM objects according to a configuration (e.g., a preconfiguration) or other signaling.

In other cases, UE 115-a may use different periodic SIM objects, which also vary in repetition frequencies, power settings, and other parameters (e.g., transmit and receive beams, measurement configurations, and other parameters). These other periodic SIM objects may also be indicated in SIM configuration 210, or may be identified at UE 115-a by other signaling, or based on a configuration (e.g., a preconfiguration) at UE 115-a.

In some cases, UE 115-a may transmit an indication of the SIM configuration used by the UE 115-a to other network nodes. The SIM configuration may include the respective transmission power levels for first transmission 215 and second transmission 220-a. The SIM configuration may be the same as SIM configuration 210 received from base station 105-a, or may be a SIM configuration determined at UE 115-a. The network node that receives the indication of the SIM configuration from UE 115-a may use the SIM configuration to receive first transmission 215 and second transmission 220-a, and may use the transmissions to perform other measurements and communications.

For example, UE 115-a may be a UE or an IAB MT, and may transmit an indication of the SIM configuration to a network node, which may be base station 105-a, another UE 115, an IAB MT, serving node, or a parent node. In another example, UE 115-a may be a base station, and IAB DU, or a serving node, and may transmit the indication of the SIM configuration to a network node, which may be a UE 115, a child IAB node, a parent IAB node, or another DU.

In another case, a network node may receive the SIM configuration from UE 115-a, and may use the information to configure SIM or other operations at other wireless devices. In these cases, the network node may be a control node, such as a base station 105, a central unit, or a parent node; UE 115-a may be a UE 115, an IAB MT, an IAB DU; and the other wireless devices may be UEs 115, IAB MTs, base station 105, or IAB DUs. These other wireless device may measure signals sent by UE 115-*a* (e.g., based on receiving additional configuration information from the network node, which may be based on the report of the SIM configuration form UE 115-*a*). The other wireless devices may use the signals (e.g., first transmission 215, second transmission 220-*a*) to perform cross-link interference (CLI) measurements. The CLI may include interference from UE 115-*a* on the other wireless devices.

Figure 3:
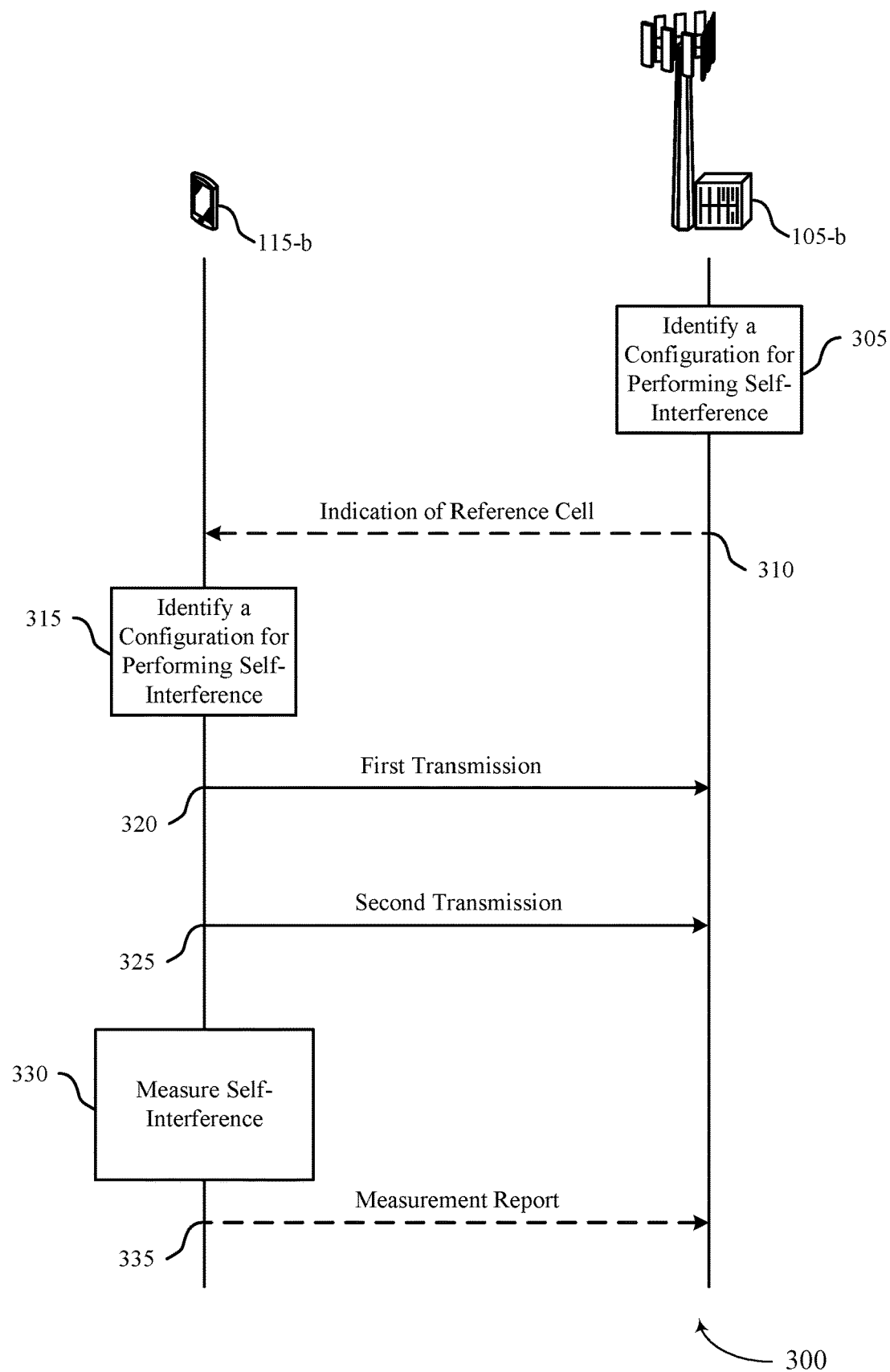
FIG. 3 illustrates an example of a process flow that supports power configuration of self-interference measurement in accordance with aspects of the present disclosure.

FIG. 3 illustrates an example of a process flow 300 that supports power configuration of self-interference measurement in accordance with aspects of the present disclosure. In some examples, process flow 300 may implement aspects of wireless communication system 100. Process flow 300 includes UE 115-*b*, which may be an example of a UE 115 as described with respect to FIGS. 1 and 2. UE 115-*b* may be an example of a UE 115, an IAB node such as a MT, a DU, or another child node, or a combination of these. Process flow 300 also includes base station 105-*b*, which may be an example of a base station 105 as described with respect to FIGS. 1 and 2. Base station 105-*b* may be an example of a base station 105, a network node, an IAB node such as a DU or a CU, or another parent node, or a combination of these.

At 305, base station 105-*b* may identify a configuration for performing SIMs, where the configuration may indicate a first transmission power associated with a first transmission and a second transmission power associated with a second transmission, where the second transmission power is higher than the first transmission power.

In some cases, at 310, base station 105-*b* may transmit an indication of the identified configuration for performing SI, where the configuration indicates a first repetition frequency associated with the first transmission and a second repetition frequency associated with the second transmission.

At 315, UE 115-*b* may identify a configuration for performing SIMs, where the configuration may indicate a first transmission power associated with a first transmission and a second transmission power associated with a second transmission, where the second transmission power is higher than the first transmission power.

In some cases, UE 115-*b* may identify the configuration information based on receiving, at 310, configuration information including an indication of the first transmission power and the second transmission power. In other cases, UE 115-*b* may determine at least the first transmission power or the second transmission power of the configuration for performing SIMs. This determination may be based on a preconfiguration, or may be determined without signaling from another device (e.g., from base station 105-*b*). In these cases, UE 115-*b* may transmit an indication of the determined first transmission power or the second transmission power.

In some cases, UE 115-*b* may identify a common SIM object for a set of SIM occasions, where the common SIM object may define a common set of measurement parameters for the set of SIM occasions. UE 115-*b* may apply the common set of measurement parameters and a first transmission power configuration corresponding to the first transmission power for a first subset of the set of SIM occasions. UE 115-*b* may also apply the common set of measurement parameters and a second transmission power configuration corresponding to the second transmission power for a second subset of the SIM occasions. In some of these cases, UE 115-*b* may then identify an association between the first transmission power configuration and the first subset of the set of SIM occasions and an association between the second transmission power configuration and the second subset of the set of SIM occasions, based on the bitmap. In some of these cases, UE 115-*b* may identify an association between the first transmission power configuration and the first subset of the set of SIM occasions and an association between the second transmission power configuration and the second subset of the set of SIM occasions based on a periodicity associated with the first subset and the second subset, or an offset between the first subset and the second subset, or a combination of these.

At 320, UE 115-*b* may transmit the first transmission at the first transmission power; and at 325, UE 115-*b* may transmit the second transmission at the second transmission power. The first transmission may be associated with a first repetition frequency and the second transmission may be associated with a second repetition frequency. The first repetition frequency may be higher than the second repetition frequency. As such, UE 115-*b* may transmit the first transmission more often than the second transmission.

The first transmission may be for measuring a first type of SI and the second transmission may be for measuring a second type of interference. For example, the first type of SI may be associated with near-field SI, and the second type of SI may be associated with reflection from an object (e.g., clutter echo).

At 330, UE 115-*b* may measure SI based on transmitting the first transmission and the second transmission. UE 115-*b* may detect a second type of SI (e.g., clutter echo) using the second transmission transmitted with the second transmission power. UE 115-*b* may identify a third transmission power, different than the second transmission power, based on detecting the second type of interference. UE 115-*b* may transmit one or more third transmissions using the third transmission power in one or more subsequent SIM occasions. UE 115-*b* may also perform a measurement process or mitigation process for the second type of SI, based on transmitting the one or more third transmissions.

In some cases, at 335, UE 115-*b* may transmit a report including an indication of the second type of the SI. The report may be a measurement report. UE 115-*b* may then receive configuration information for the third transmission power, where the identifying the third transmission power is based on receiving the configuration information.

In some cases, UE 115-*b* may determine the third transmission power, and may transmit an indication of the determined third transmission power. In some cases, UE 115-*b* may receive an indication of a confirmation of the third transmission power, and UE 115-*b* may identify the third transmission power based on receiving the indication of the confirmation of the third transmission power.

In cases where UE 115-*b* uses a common SIM object to perform SIMs, UE 115-*b* may transmit a first report including a first measurement result corresponding to the first subset of the set of SIM occasions, and UE 115-*b* may also transmit a second report including a second measurement result corresponding to the second subset of the set of SIM occasions.

Figure 4:
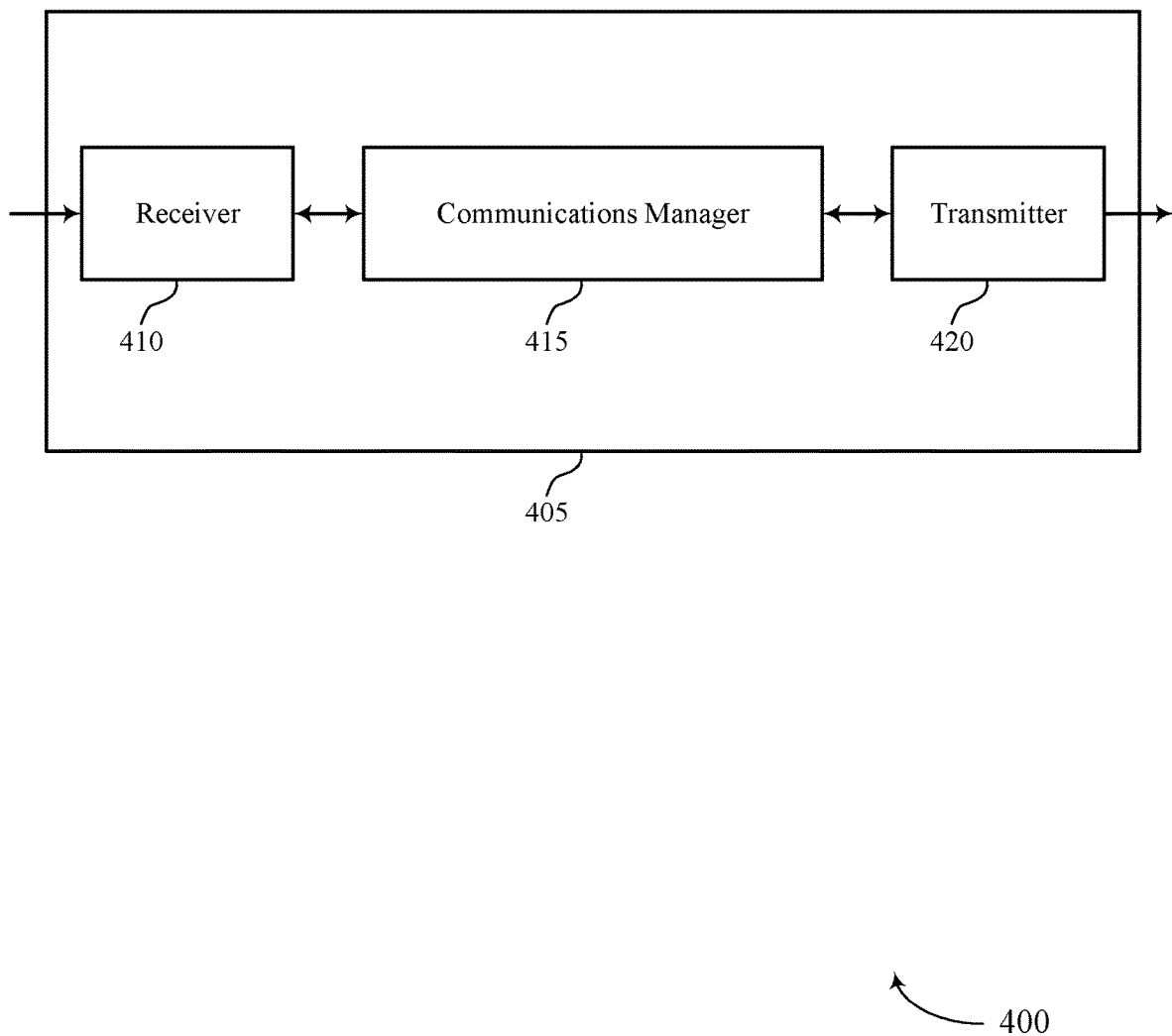
FIGS. 4 and 5 show block diagrams of devices that support power configuration of self-interference measurement in accordance with aspects of the present disclosure.

FIG. 4 shows a block diagram 400 of a device 405 that supports power configuration of SIM in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to power configuration of SIM, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a configuration for performing SIM, where the configuration indicates a first transmission power associated with a first transmission and a second transmission power associated with a second transmission, where the second transmission power is higher than the first transmission power, transmit the first transmission at the first transmission power and the second transmission at the second transmission power, where the first transmission is associated with a first repetition frequency and the second transmission is associated with a second repetition frequency, and measure SI based on transmitting the first transmission and the second transmission. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 435 may be implemented as sets of analog components (e.g., amplifiers, filters, phase shifters, antennas, etc.) The wireless modem may obtain and decode signals from the receiver 410 over a receive interface, and may output signals for transmission to the transmitter 435 over a transmit interface.

The actions performed by the communications manager 415 as described herein may be implemented to realize one or more potential advantages. One implementation may allow a UE 115 to save power and increase battery life by improving the efficiency with which the UE 115 measures and mitigates interference. By determining the power configuration, the UE 115 may measure interference more reliably, as well as receive communications from a base station regarding future power usages and mitigation techniques. Avoidance of interference at the UE 115 may subsequently save power at the UE 115 by improving communications reliability and decreasing the number of message retransmissions to and from the UE 115.

Figure 5:
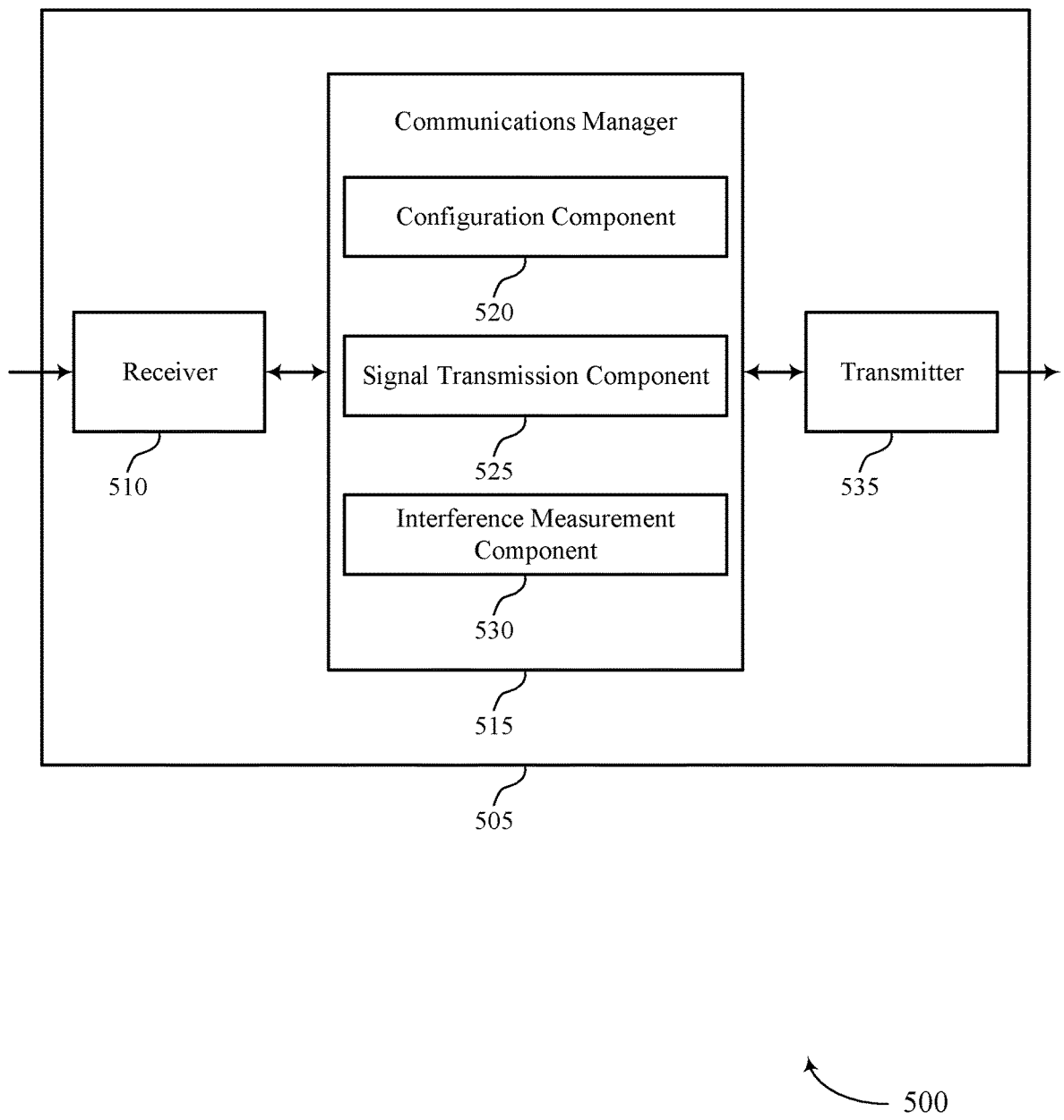

FIG. 5 shows a block diagram 500 of a device 505 that supports power configuration of SIM in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to power configuration of SIM, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a configuration component 520, a signal transmission component 525, and an interference measurement component 530. The communications manager 515 may be an example of aspects of the communications manager 710 described herein.

The configuration component 520 may identify a configuration for performing SIM, where the configuration indicates a first transmission power associated with a first transmission and a second transmission power associated with a second transmission, where the second transmission power is higher than the first transmission power.

The signal transmission component 525 may transmit the first transmission at the first transmission power and the second transmission at the second transmission power, where the first transmission is associated with a first repetition frequency and the second transmission is associated with a second repetition frequency.

The interference measurement component 530 may measure SI based on transmitting the first transmission and the second transmission.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

A processor of a UE 115 (e.g., controlling the receiver 510, the transmitter 535, or the transceiver 720 as described with reference to FIG. 7) may efficiently operate the components described herein to save power and increase battery life of the UE 115. For example, the processor of the UE 115 may operate the transmitter 535 to transmit signals that may be used to measure different types of SI. The processor of the UE 115 may operate the receiver 510 to receive signals (e.g., transmitted by the UE 115) to measure sources of SI. The processor of the UE 115 may determine to perform interference mitigation actions, and may operate a transmitter 535 of the UE 115 to transmit a report of the measured interference. Each of the operations by the processor described herein may help save power and increase battery life of the UE 115 by determining sources of interference, performing actions to mitigate the interference, and thereby decrease the number of retransmission to and from the UE 115, while also improving communications reliability.

Figure 6:
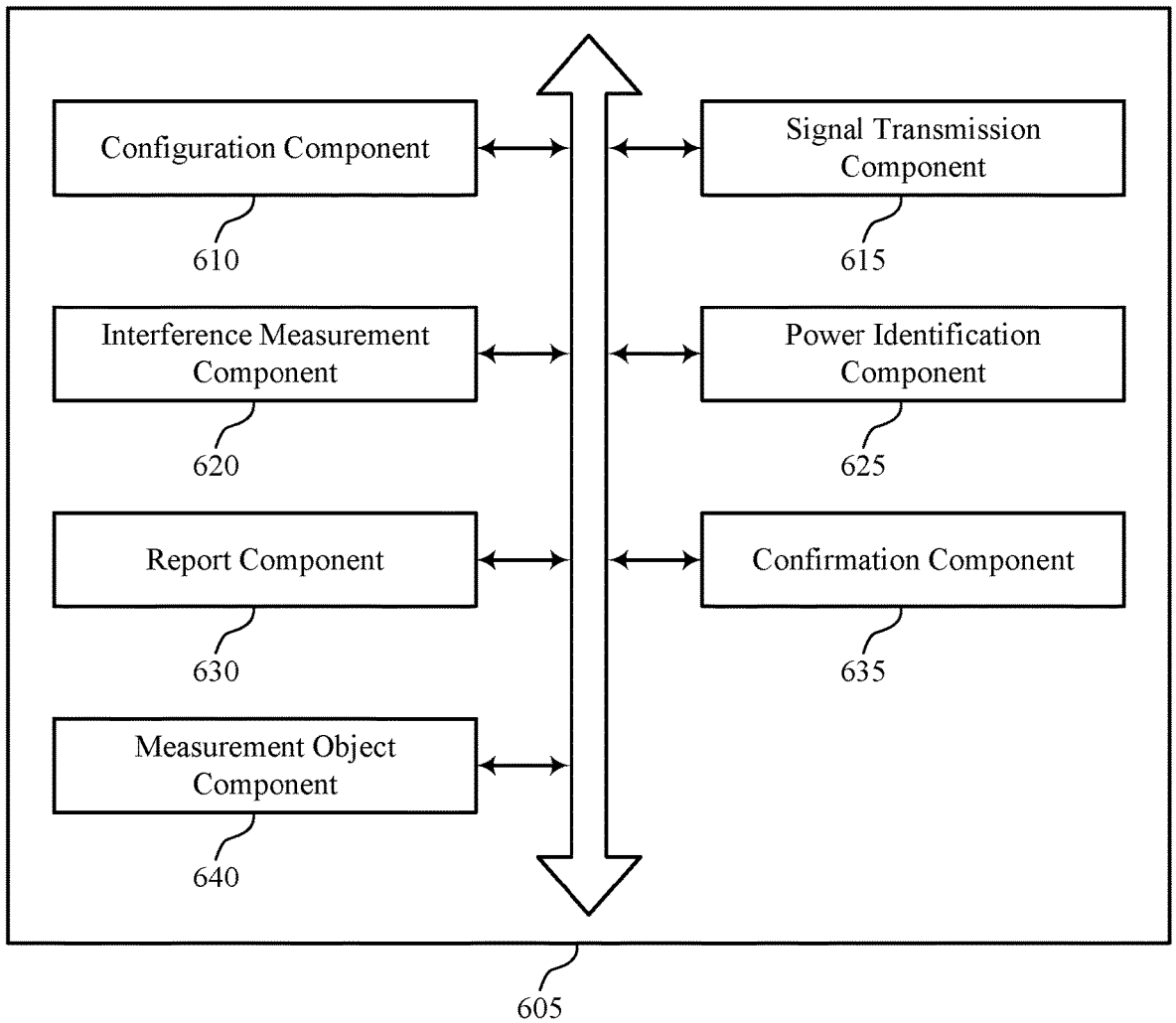
FIG. 6 shows a block diagram of a communications manager that supports power configuration of self-interference measurement in accordance with aspects of the present disclosure.

FIG. 6 shows a block diagram 600 of a communications manager 605 that supports power configuration of SIM in accordance with aspects of the present disclosure. The communications manager 605 may be an example of aspects of a communications manager 415, a communications manager 515, or a communications manager 710 described herein. The communications manager 605 may include a configuration component 610, a signal transmission component 615, an interference measurement component 620, a power identification component 625, a report component 630, a confirmation component 635, and a measurement object component 640. Each of these modules may communicate, directly or indirectly, with one another (e.g., via one or more buses).

The configuration component 610 may identify a configuration for performing SIM, where the configuration indicates a first transmission power associated with a first transmission and a second transmission power associated with a second transmission, where the second transmission power is higher than the first transmission power. In some examples, the configuration component 610 may receive configuration information for the third transmission power, where identifying the third transmission power is based on receiving the configuration information. In some examples, the configuration component 610 may receive configuration information including an indication of the first transmission power and the second transmission power. In some cases, the wireless device is a UE, a base station, a distributed unit, a mobile terminal, or an integrated access and backhaul node.

The signal transmission component 615 may transmit the first transmission at the first transmission power and the second transmission at the second transmission power, where the first transmission is associated with a first repetition frequency and the second transmission is associated with a second repetition frequency. In some examples, the signal transmission component 615 may transmit one or more third transmissions using the third transmission power in one or more subsequent SIM occasions. In some cases, the first repetition frequency is higher than the second repetition frequency.

In some cases, the first transmission is for measuring a first type of the SI and the second transmission is for measuring a second type of the SI. In some cases, the first transmission indicates signal strength of the wireless device.

The interference measurement component 620 may measure SI based on transmitting the first transmission and the second transmission. In some examples, the interference measurement component 620 may detect a second type of SI using the second transmission transmitted with the second transmission power. In some examples, the interference measurement component 620 may perform a measurement process or mitigation process for the second type of SI based on transmitting the one or more third transmissions. In some cases, the first type of SI is associated with near-field SI, and the second type of SI is associated with reflection from an object.

The power identification component 625 may identify a third transmission power different than the second transmission power based on the detected second type of SI. In some examples, the power identification component 625 may determine the third transmission power. In some examples, the power identification component 625 may determine at least the first transmission power or the second transmission power of the configuration for performing SIMs.

The report component 630 may transmit a report including an indication of the detected second type of SI. In some examples, the report component 630 may transmit an indication of the determined third transmission power. In some examples, the report component 630 may transmit an indication of the determined first transmission power or second transmission power. In some examples, the report component 630 may transmit a first report including a first measurement result corresponding to the first subset of the set of SIM occasions. In some examples, the report component 630 may transmit a second report including a second measurement result corresponding to the second subset of the set of SIM occasions.

The confirmation component 635 may receive an indication of a confirmation of the third transmission power, where identifying the third transmission power is based on receiving the indication of the confirmation of the third transmission power.

The measurement object component 640 may identify a common periodic SIM object for a set of SIM occasions, where the common periodic SIM object defines a common set of measurement parameters for the set of SIM occasions. In some examples, the measurement object component 640 may apply the common set of measurement parameters and a first transmission power configuration corresponding to the first transmission power for a first subset of the set of SIM occasions. In some examples, the measurement object component 640 may apply the common set of measurement parameters and a second transmission power configuration corresponding to the second transmission power for a second subset of the set of SIM occasions.

In some examples, the measurement object component 640 may identify an association between the first transmission power configuration and the first subset of the set of SIM occasions and an association between the second transmission power configuration and the second subset of the set of SIM occasions based on a bitmap. In some examples, the measurement object component 640 may identify an association between the first transmission power configuration and the first subset of the set of SIM occasions and an association between the second transmission power configuration and the second subset of the set of SIM occasions based on a periodicity associated with the first subset and the second subset, or an offset between the first subset and the second subset, or a combination thereof. In some examples, the measurement object component 640 may identify a set of separate SIM objects for a set of SIM occasions, where each of the set of SIM objects defines a set of measurement parameters for one or more of the set of SIM occasions.

Figure 7:
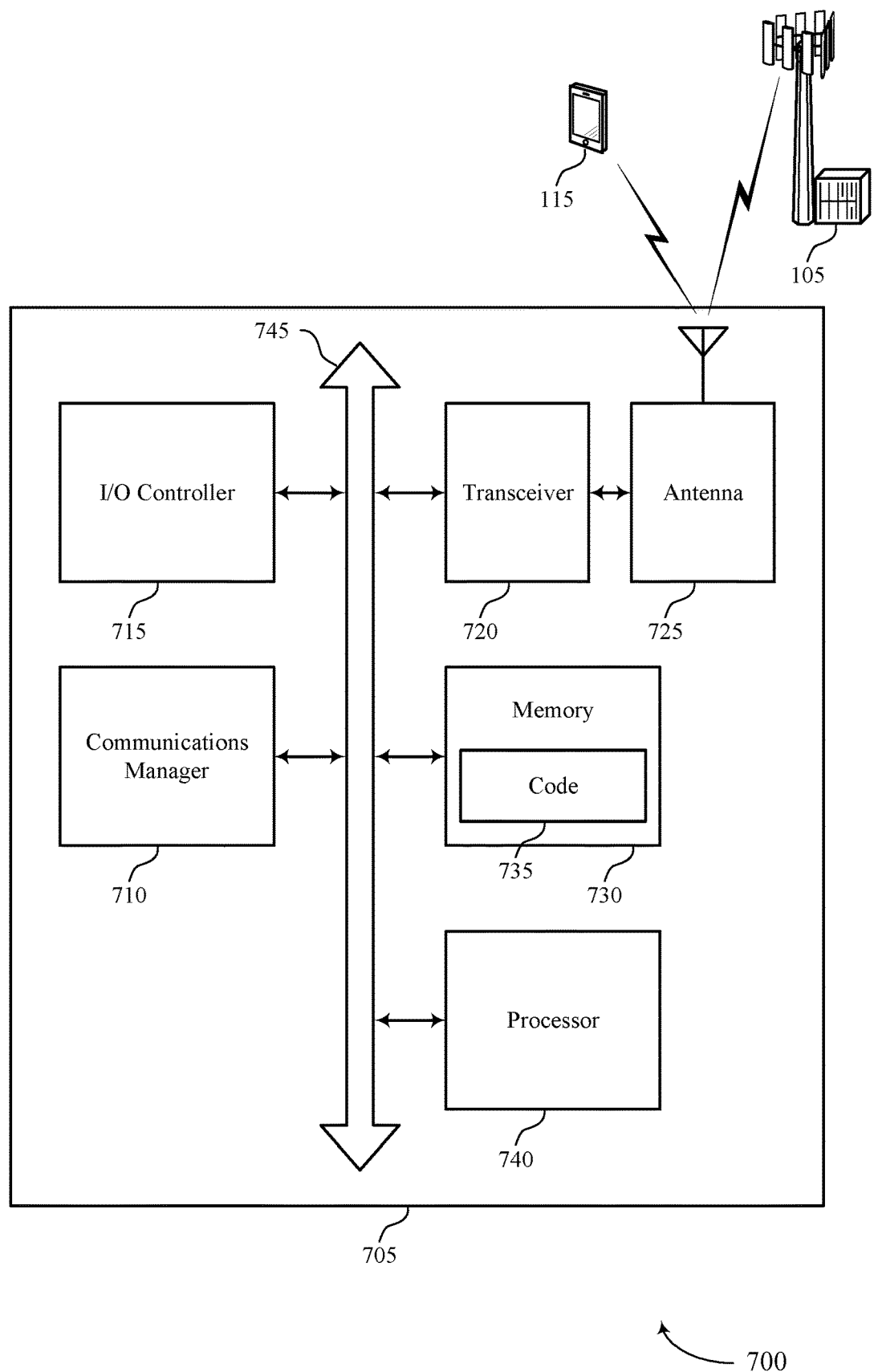
FIG. 7 shows a diagram of a system including a device that supports power configuration of self-interference measurement in accordance with aspects of the present disclosure.

FIG. 7 shows a diagram of a system 700 including a device 705 that supports power configuration of SIM in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a configuration for performing SIM, where the configuration indicates a first transmission power associated with a first transmission and a second transmission power associated with a second transmission, where the second transmission power is higher than the first transmission power, transmit the first transmission at the first transmission power and the second transmission at the second transmission power, where the first transmission is associated with a first repetition frequency and the second transmission is associated with a second repetition frequency, and measure SI based on transmitting the first transmission and the second transmission.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting power configuration of SIM).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
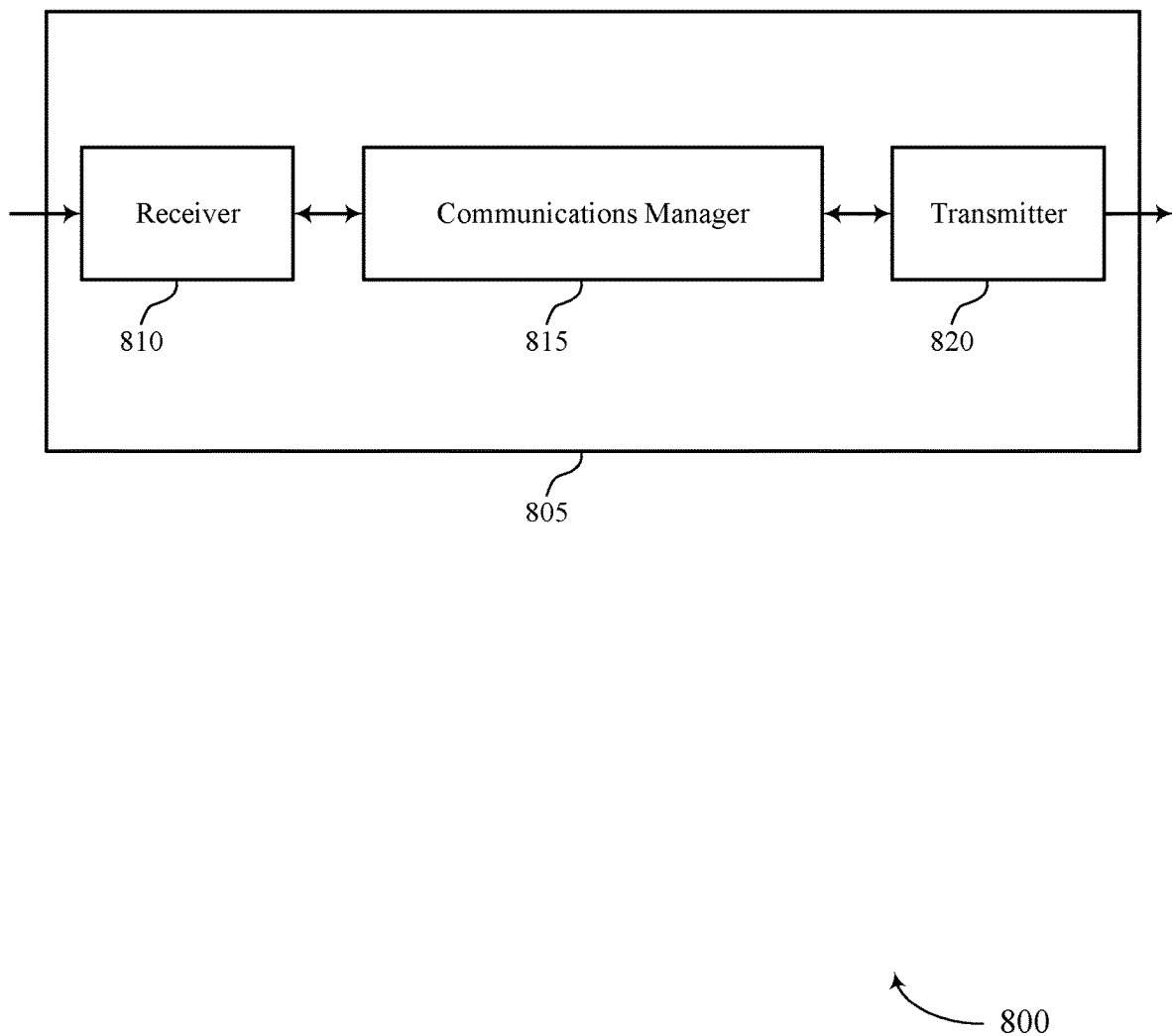
FIGS. 8 and 9 show block diagrams of devices that support power configuration of self-interference measurement in accordance with aspects of the present disclosure.

FIG. 8 shows a block diagram 800 of a device 805 that supports power configuration of SIM in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to power configuration of SIM, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a configuration for performing SIM, where the configuration indicates a first transmission power associated with a first transmission and a second transmission power associated with a second transmission, where the second transmission power is higher than the first transmission power, transmit, to a wireless device, an indication of the configuration for performing SI, where the configuration indicates a first repetition frequency associated with the first transmission and a second repetition frequency associated with the second transmission, and receive, from the wireless device, a measurement report including an indication of measured SI based on the configuration for performing SI. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
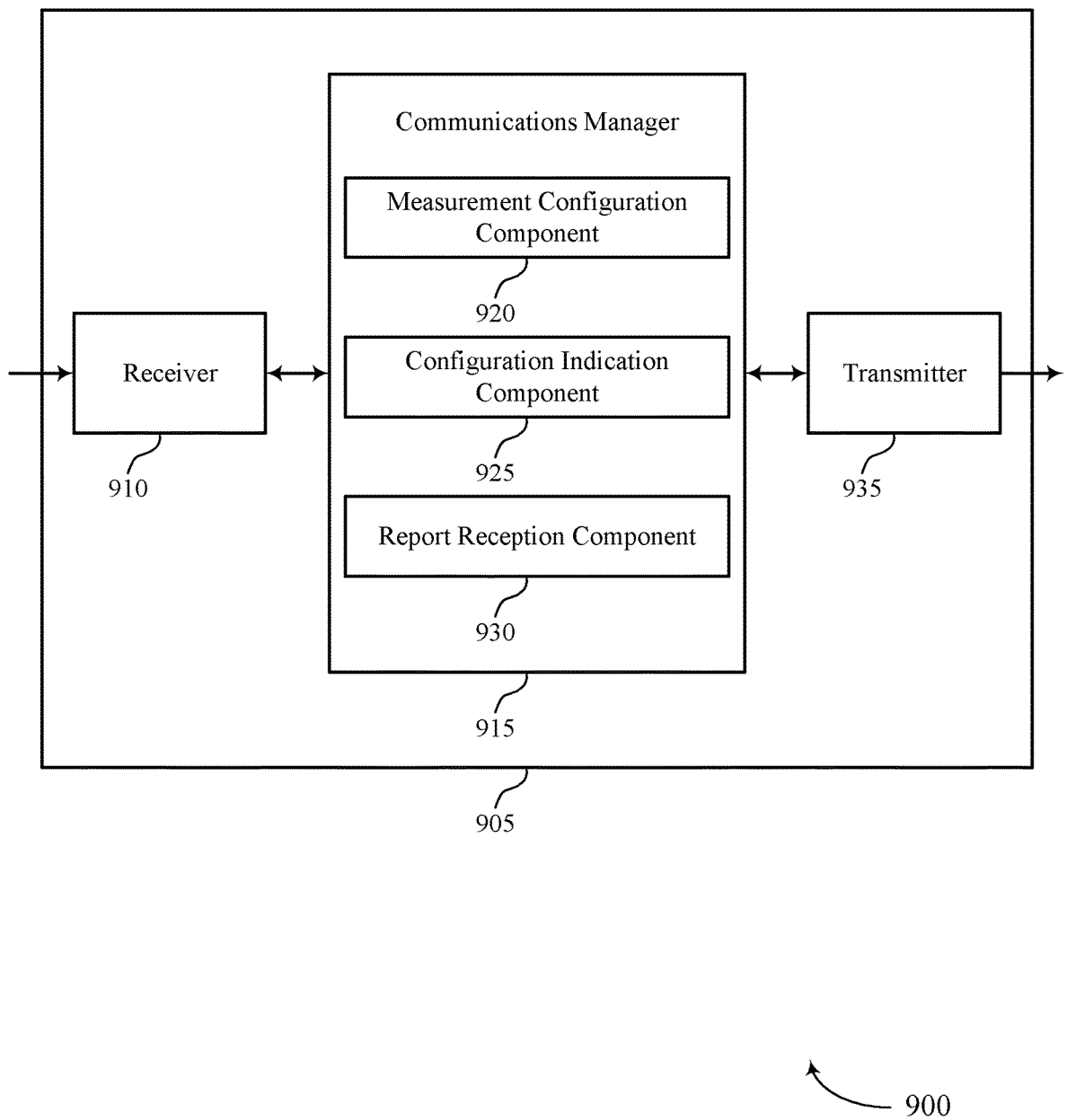

FIG. 9 shows a block diagram 900 of a device 905 that supports power configuration of SIM in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to power configuration of SIM, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a measurement configuration component 920, a configuration indication component 925, and a report reception component 930. The communications manager 915 may be an example of aspects of the communications manager 1110 described herein.

The measurement configuration component 920 may identify a configuration for performing SIM, where the configuration indicates a first transmission power associated with a first transmission and a second transmission power associated with a second transmission, where the second transmission power is higher than the first transmission power.

The configuration indication component 925 may transmit, to a wireless device, an indication of the configuration for performing SI, where the configuration indicates a first repetition frequency associated with the first transmission and a second repetition frequency associated with the second transmission.

The report reception component 930 may receive, from the wireless device, a measurement report including an indication of measured SI based on the configuration for performing SI.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
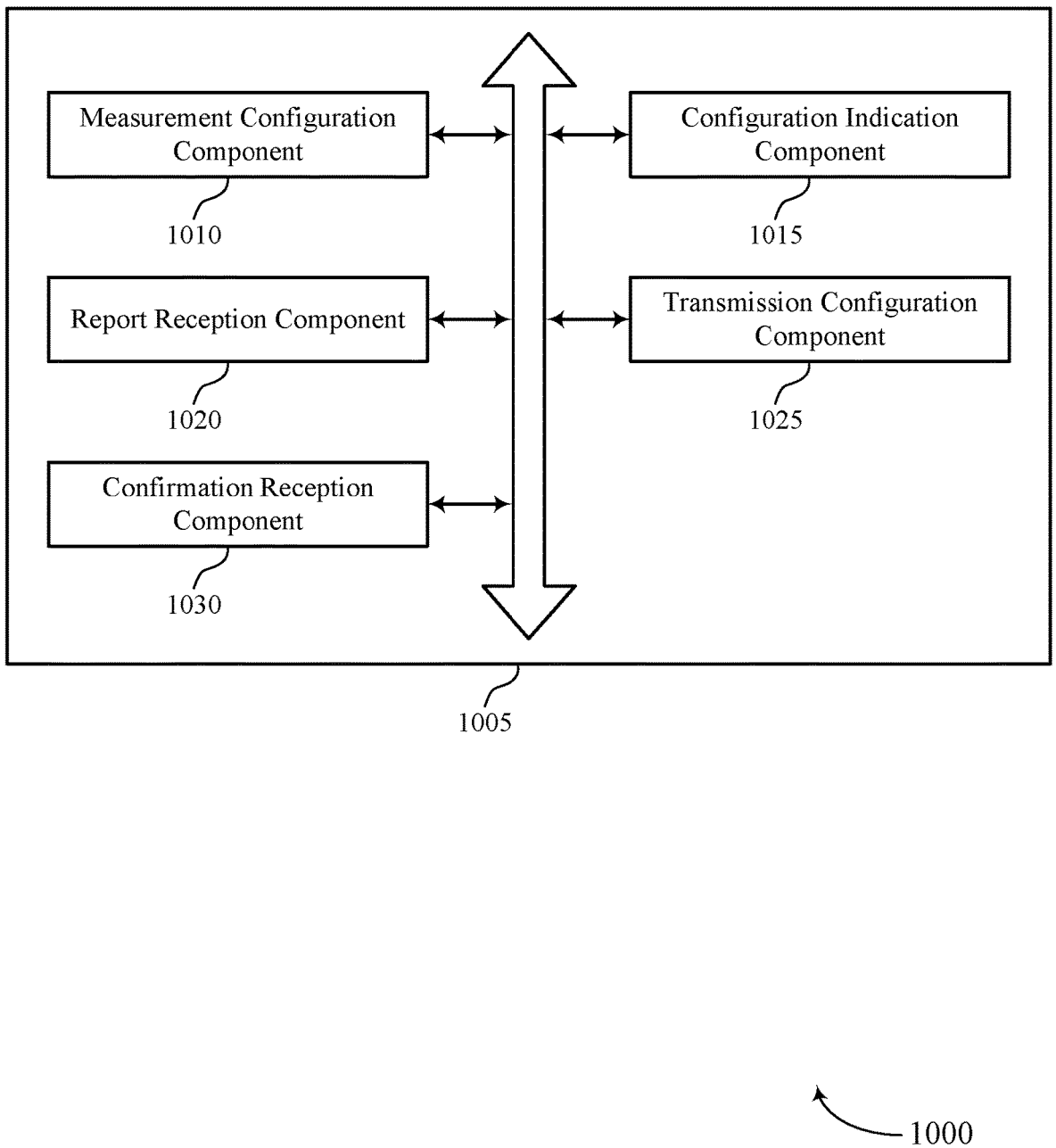
FIG. 10 shows a block diagram of a communications manager that supports power configuration of self-interference measurement in accordance with aspects of the present disclosure.

FIG. 10 shows a block diagram 1000 of a communications manager 1005 that supports power configuration of SIM in accordance with aspects of the present disclosure. The communications manager 1005 may be an example of aspects of a communications manager 815, a communications manager 915, or a communications manager 1110 described herein. The communications manager 1005 may include a measurement configuration component 1010, a configuration indication component 1015, a report reception component 1020, a transmission configuration component 1025, and a confirmation reception component 1030. Each of these modules may communicate, directly or indirectly, with one another (e.g., via one or more buses).

The measurement configuration component 1010 may identify a configuration for performing SIM, where the configuration indicates a first transmission power associated with a first transmission and a second transmission power associated with a second transmission, where the second transmission power is higher than the first transmission power.

In some cases, the first transmission is for measuring a first type of the SI and the second transmission is for measuring a second type of the SI. In some cases, the first type of SI is associated with near-field SI, and the second type of SI is associated with reflection from an object. In some cases, the first transmission indicates signal strength of the wireless device. In some cases, the wireless device is a UE, a base station, a distributed unit, a mobile terminal, or an integrated access and backhaul node. In some cases, the network node is a UE, a base station, a distributed unit, a central unit, a mobile terminal, or an integrated access and backhaul node.

The configuration indication component 1015 may transmit, to a wireless device, an indication of the configuration for performing SI, where the configuration indicates a first repetition frequency associated with the first transmission and a second repetition frequency associated with the second transmission. In some cases, the indication of the configuration includes a common periodic SIM object for a set of SIM occasions, where the common periodic SIM object defines a common set of measurement parameters for the set of SIM occasions. In some cases, the first repetition frequency is higher than the second repetition frequency.

The report reception component 1020 may receive, from the wireless device, a measurement report including an indication of measured SI based on the configuration for performing SI. In some examples, the report reception component 1020 may receive, from the wireless device, a report including an indication of a detected second type of the SI.

In some examples, the report reception component 1020 may receive, from the wireless device, a first report including a first measurement result corresponding to the first subset of the set of SIM occasions. In some examples, the report reception component 1020 may receive, from the wireless device, a second report including a second measurement result corresponding to the second subset of the set of SIM occasions.

The transmission configuration component 1025 may transmit, to the wireless device, configuration information for a third transmission power. In some examples, the transmission configuration component 1025 may transmit, to the wireless device, an indication of the determined third transmission power.

The confirmation reception component 1030 may receive, from the wireless device, an indication of a confirmation of the third transmission power, where identifying the third transmission power is based on receiving the indication of the confirmation of the third transmission power.

Figure 11:
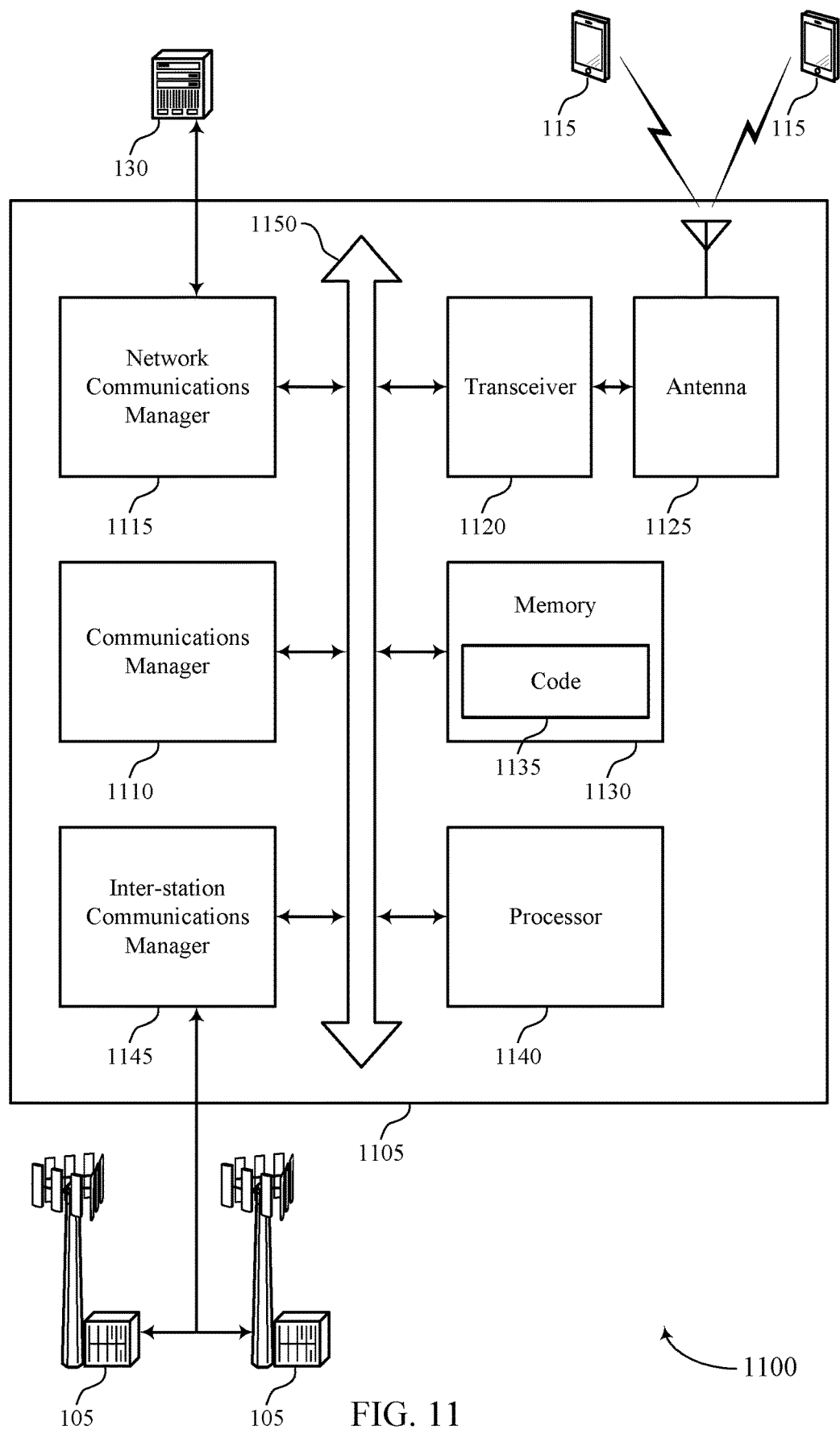
FIG. 11 shows a diagram of a system including a device that supports power configuration of self-interference measurement in accordance with aspects of the present disclosure.

FIG. 11 shows a diagram of a system 1100 including a device 1105 that supports power configuration of SIM in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a configuration for performing SIM, where the configuration indicates a first transmission power associated with a first transmission and a second transmission power associated with a second transmission, where the second transmission power is higher than the first transmission power, transmit, to a wireless device, an indication of the configuration for performing SI, where the configuration indicates a first repetition frequency associated with the first transmission and a second repetition frequency associated with the second transmission, and receive, from the wireless device, a measurement report including an indication of measured SI based on the configuration for performing SI.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting power configuration of SIM).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
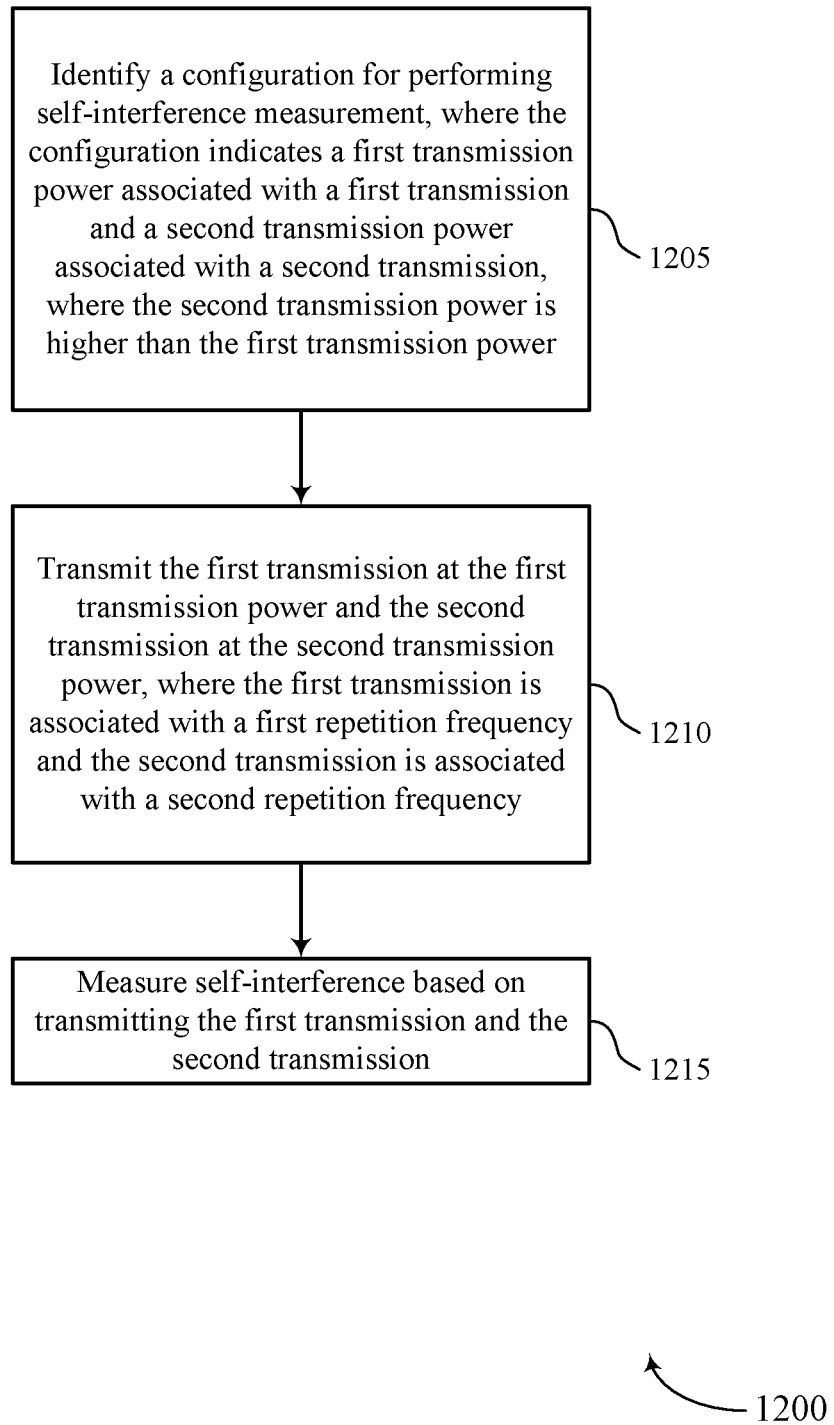
FIGS. 12 through 15 show flowcharts illustrating methods that support power configuration of self-interference measurement in accordance with aspects of the present disclosure.

FIG. 12 shows a flowchart illustrating a method 1200 that supports power configuration of SIM in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may identify a configuration for performing SIM, where the configuration indicates a first transmission power associated with a first transmission and a second transmission power associated with a second transmission, where the second transmission power is higher than the first transmission power. The operations of 1205 may be performed according to the methods described herein. In some examples, aspects of the operations of 1205 may be performed by a configuration component as described with reference to FIGS. 4 through 7.

At 1210, the UE may transmit the first transmission at the first transmission power and the second transmission at the second transmission power, where the first transmission is associated with a first repetition frequency and the second transmission is associated with a second repetition frequency. The operations of 1210 may be performed according to the methods described herein. In some examples, aspects of the operations of 1210 may be performed by a signal transmission component as described with reference to FIGS. 4 through 7.

At 1215, the UE may measure SI based on transmitting the first transmission and the second transmission. The operations of 1215 may be performed according to the methods described herein. In some examples, aspects of the operations of 1215 may be performed by an interference measurement component as described with reference to FIGS. 4 through 7.

Figure 13:
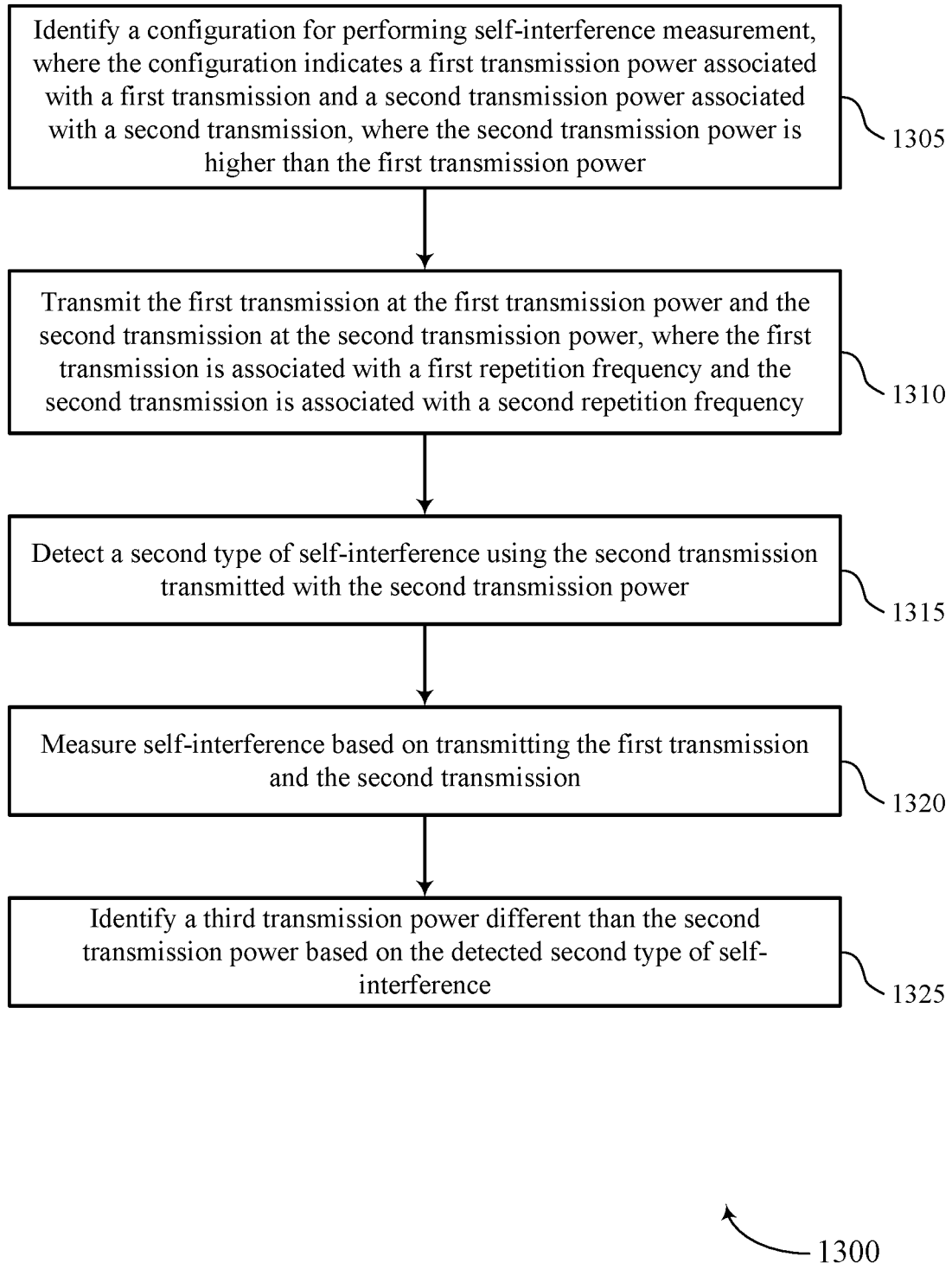

FIG. 13 shows a flowchart illustrating a method 1300 that supports power configuration of SIM in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may identify a configuration for performing SIM, where the configuration indicates a first transmission power associated with a first transmission and a second transmission power associated with a second transmission, where the second transmission power is higher than the first transmission power. The operations of 1305 may be performed according to the methods described herein. In some examples, aspects of the operations of 1305 may be performed by a configuration component as described with reference to FIGS. 4 through 7.

At 1310, the UE may transmit the first transmission at the first transmission power and the second transmission at the second transmission power, where the first transmission is associated with a first repetition frequency and the second transmission is associated with a second repetition frequency. The operations of 1310 may be performed according to the methods described herein. In some examples, aspects of the operations of 1310 may be performed by a signal transmission component as described with reference to FIGS. 4 through 7.

At 1315, the UE may detect a second type of SI using the second transmission transmitted with the second transmission power. The operations of 1315 may be performed according to the methods described herein. In some examples, aspects of the operations of 1315 may be performed by an interference measurement component as described with reference to FIGS. 4 through 7.

At 1320, the UE may measure SI based on transmitting the first transmission and the second transmission. The operations of 1320 may be performed according to the methods described herein. In some examples, aspects of the operations of 1320 may be performed by an interference measurement component as described with reference to FIGS. 4 through 7.

At 1325, the UE may identify a third transmission power different than the second transmission power based on the detected second type of SI. The operations of 1325 may be performed according to the methods described herein. In some examples, aspects of the operations of 1325 may be performed by a power identification component as described with reference to FIGS. 4 through 7.

Figure 14:
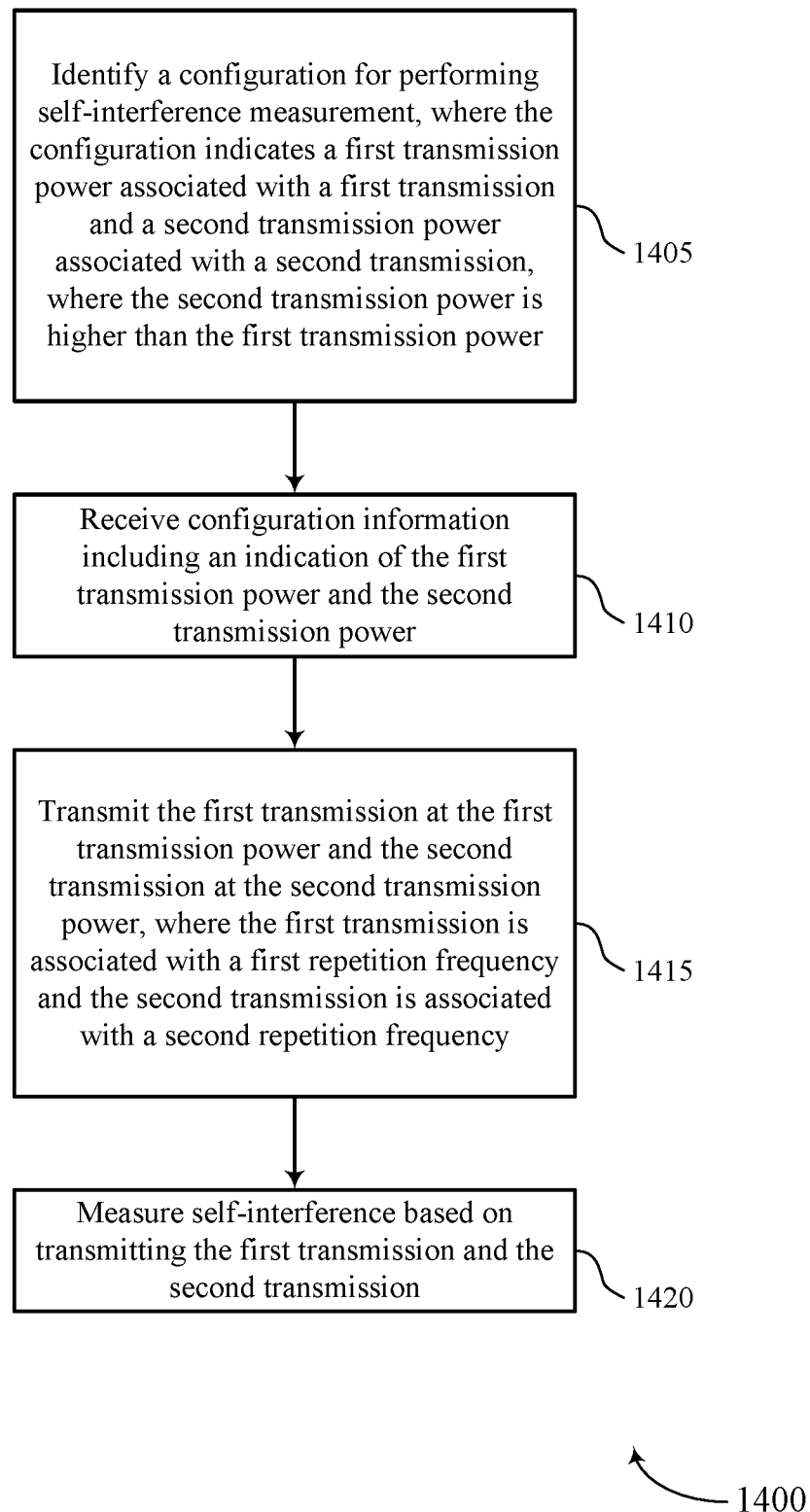

FIG. 14 shows a flowchart illustrating a method 1400 that supports power configuration of SIM in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may identify a configuration for performing SIM, where the configuration indicates a first transmission power associated with a first transmission and a second transmission power associated with a second transmission, where the second transmission power is higher than the first transmission power. The operations of 1405 may be performed according to the methods described herein. In some examples, aspects of the operations of 1405 may be performed by a configuration component as described with reference to FIGS. 4 through 7.

At 1410, the UE may receive configuration information including an indication of the first transmission power and the second transmission power. The operations of 1410 may be performed according to the methods described herein. In some examples, aspects of the operations of 1410 may be performed by a configuration component as described with reference to FIGS. 4 through 7.

At 1415, the UE may transmit the first transmission at the first transmission power and the second transmission at the second transmission power, where the first transmission is associated with a first repetition frequency and the second transmission is associated with a second repetition frequency. The operations of 1415 may be performed according to the methods described herein. In some examples, aspects of the operations of 1415 may be performed by a signal transmission component as described with reference to FIGS. 4 through 7.

At 1420, the UE may measure SI based on transmitting the first transmission and the second transmission. The operations of 1420 may be performed according to the methods described herein. In some examples, aspects of the operations of 1420 may be performed by an interference measurement component as described with reference to FIGS. 4 through 7.

Figure 15:
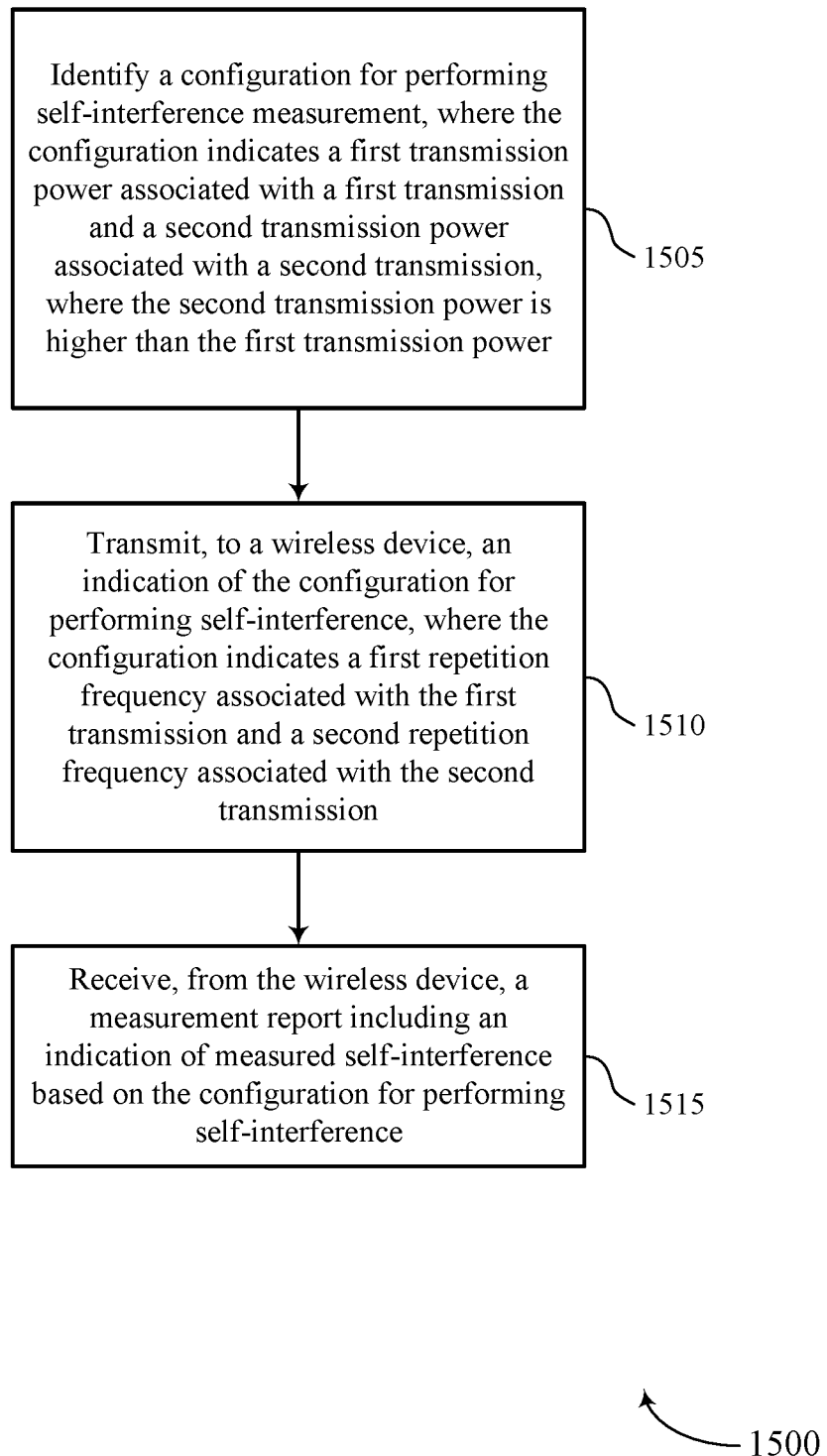

FIG. 15 shows a flowchart illustrating a method 1500 that supports power configuration of SIM in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may identify a configuration for performing SIM, where the configuration indicates a first transmission power associated with a first transmission and a second transmission power associated with a second transmission, where the second transmission power is higher than the first transmission power. The operations of 1505 may be performed according to the methods described herein. In some examples, aspects of the operations of 1505 may be performed by a measurement configuration component as described with reference to FIGS. 8 through 11.

At 1510, the base station may transmit, to a wireless device, an indication of the configuration for performing SI, where the configuration indicates a first repetition frequency associated with the first transmission and a second repetition frequency associated with the second transmission. The operations of 1510 may be performed according to the methods described herein. In some examples, aspects of the operations of 1510 may be performed by a configuration indication component as described with reference to FIGS. 8 through 11.

At 1515, the base station may receive, from the wireless device, a measurement report including an indication of measured SI based on the configuration for performing SI. The operations of 1515 may be performed according to the methods described herein. In some examples, aspects of the operations of 1515 may be performed by a report reception component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a wireless device comprising: identifying a configuration for performing self-interference measurement, wherein the configuration indicates a first transmission power associated with a first transmission and a second transmission power associated with a second transmission, wherein the second transmission power is higher than the first transmission power; transmitting the first transmission at the first transmission power and the second transmission at the second transmission power, wherein the first transmission is associated with a first repetition frequency and the second transmission is associated with a second repetition frequency; and measuring self-interference based at least in part on transmitting the first transmission and the second transmission.

Aspect 2: The method of aspect 1, further comprising: detecting a second type of self-interference using the second transmission transmitted with the second transmission power; and identifying a third transmission power different than the second transmission power based at least in part on the detected second type of self-interference.

Aspect 3: The method of aspect 2, further comprising: transmitting one or more third transmissions using the third transmission power in one or more subsequent self-interference measurement occasions.

Aspect 4: The method of aspect 3, further comprising: performing a measurement process or mitigation process for the second type of self-interference based at least in part on transmitting the one or more third transmissions.

Aspect 5: The method of any of aspects 2 through 4, further comprising: transmitting a report comprising an indication of the detected second type of self-interference; and receiving configuration information for the third transmission power, wherein identifying the third transmission power is based at least in part on receiving the configuration information.

Aspect 6: The method of any of aspects 2 through 5, further comprising: determining the third transmission power; and transmitting an indication of the determined third transmission power.

Aspect 7: The method of aspect 6, further comprising: receiving an indication of a confirmation of the third transmission power, wherein identifying the third transmission power is based at least in part on receiving the indication of the confirmation of the third transmission power.

Aspect 8: The method of any of aspects 1 through 7, wherein identifying the configuration for performing self-interference measurements comprises: receiving configuration information comprising an indication of the first transmission power and the second transmission power.

Aspect 9: The method of any of aspects 1 through 8, wherein identifying the configuration for performing self-interference measurements comprises: determining at least the first transmission power or the second transmission power of the configuration for performing self-interference measurements.

Aspect 10: The method of aspect 9, further comprising: transmitting an indication of the determined first transmission power or second transmission power.

Aspect 11: The method of any of aspects 1 through 10, further comprising: identifying a common periodic self-interference measurement object for a set of self-interference measurement occasions, wherein the common periodic self-interference measurement object defines a common set of measurement parameters for the set of self-interference measurement occasions; applying the common set of measurement parameters and a first transmission power configuration corresponding to the first transmission power for a first subset of the set of self-interference measurement occasions; and applying the common set of measurement parameters and a second transmission power configuration corresponding to the second transmission power for a second subset of the set of self-interference measurement occasions.

Aspect 12: The method of aspect 11, further comprising: identifying an association between the first transmission power configuration and the first subset of the set of self-interference measurement occasions and an association between the second transmission power configuration and the second subset of the set of self-interference measurement occasions based at least in part on a bitmap.

Aspect 13: The method of any of aspects 11 through 12, further comprising: identifying an association between the first transmission power configuration and the first subset of the set of self-interference measurement occasions and an association between the second transmission power configuration and the second subset of the set of self-interference measurement occasions based at least in part on a periodicity associated with the first subset and the second subset, or an offset between the first subset and the second subset, or a combination thereof.

Aspect 14: The method of any of aspects 11 through 13, further comprising: transmitting a first report comprising a first measurement result corresponding to the first subset of the set of self-interference measurement occasions; and transmitting a second report comprising a second measurement result corresponding to the second subset of the set of self-interference measurement occasions.

Aspect 15: The method of any of aspects 1 through 14, further comprising: identifying a plurality of separate self-interference measurement objects for a set of self-interference measurement occasions, wherein each of the plurality of separate self-interference measurement objects defines a set of measurement parameters for one or more of the set of self-interference measurement occasions.

Aspect 16: The method of any of aspects 1 through 15, wherein the first repetition frequency is higher than the second repetition frequency.

Aspect 17: The method of any of aspects 1 through 16, wherein the first transmission is for measuring a first type of the self-interference and the second transmission is for measuring a second type of the self-interference.

Aspect 18: The method of aspect 17, wherein the first type of self-interference is associated with near-field self-interference, and the second type of self-interference is associated with reflection from an object.

Aspect 19: The method of any of aspects 1 through 18, wherein the first transmission indicates signal strength of the wireless device.

Aspect 20: The method of any of aspects 1 through 19, wherein the wireless device is a UE, a base station, a distributed unit, a mobile terminal, or an integrated access and backhaul node.

Aspect 21: A method for wireless communications at a network node, comprising: identifying a configuration for performing self-interference measurement, wherein the configuration indicates a first transmission power associated with a first transmission and a second transmission power associated with a second transmission, wherein the second transmission power is higher than the first transmission power; transmitting, to a wireless device, an indication of the configuration for performing self-interference, wherein the configuration indicates a first repetition frequency associated with the first transmission and a second repetition frequency associated with the second transmission; and receiving, from the wireless device, a measurement report comprising an indication of measured self-interference based at least in part on the configuration for performing self-interference.

Aspect 22: The method of aspect 21, further comprising: receiving, from the wireless device, a report comprising an indication of a detected second type of the self-interference; and transmitting, to the wireless device, configuration information for a third transmission power.

Aspect 23: The method of aspect 22, further comprising: transmitting, to the wireless device, an indication of the third transmission power.

Aspect 24: The method of aspect 23, further comprising: receiving, from the wireless device, an indication of a confirmation of the third transmission power; and identifying the third transmission power based at least in part on receiving the indication of the confirmation of the third transmission power.

Aspect 25: The method of any of aspects 21 through 24, wherein the indication of the configuration comprises a common self-interference measurement object for a set of self-interference measurement occasions, the common self-interference measurement object defines a common set of measurement parameters for the set of self-interference measurement occasions.

Aspect 26: The method of aspect 25, further comprising: receiving, from the wireless device, a first report comprising a first measurement result corresponding to a first subset of the set of self-interference measurement occasions; and receiving, from the wireless device, a second report comprising a second measurement result corresponding to a second subset of the set of self-interference measurement occasions.

Aspect 27: The method of any of aspects 21 through 26, wherein the network node is a UE, a base station, a distributed unit, a central unit, a mobile terminal, or an integrated access and backhaul node.

Aspect 28: An apparatus comprising a processor; memory coupled with the processor; and instructions stored in the memory and executable by the processor to cause the apparatus to perform a method of any of aspects 1 through 20.

Aspect 29: An apparatus comprising at least one means for performing a method of any of aspects 1 through 20.

Aspect 30: A non-transitory computer-readable medium storing code the code comprising instructions executable by a processor to perform a method of any of aspects 1 through 20.

Aspect 31: An apparatus for wireless communications at a network node, comprising a processor; memory coupled with the processor; and instructions stored in the memory and executable by the processor to cause the apparatus to perform a method of any of aspects 21 through 27.

Aspect 32: An apparatus for wireless communications at a network node, comprising at least one means for performing a method of any of aspects 21 through 27.

Aspect 33: A non-transitory computer-readable medium storing code for wireless communications at a network node, the code comprising instructions executable by a processor to perform a method of any of aspects 21 through 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device comprising:
   receiving signaling comprising an indication of a configuration for performing periodic self-interference measurement, wherein the configuration indicates a first transmission power associated with a first periodic transmission and a second transmission power associated with a second periodic transmission, wherein the second transmission power is higher than the first transmission power;
   transmitting, according to the configuration, the first periodic transmission at the first transmission power and the second periodic transmission at the second transmission power, wherein the first periodic transmission is associated with a first repetition frequency and the second periodic transmission is associated with a second repetition frequency; and
   measuring self-interference based at least in part on transmitting the first periodic transmission and the second periodic transmission.

2. The method of claim 1, further comprising:
   detecting a second type of self-interference using the second periodic transmission transmitted with the second transmission power; and
   identifying a third transmission power different than the second transmission power based at least in part on the detected second type of self-interference.

3. The method of claim 2, further comprising:
   transmitting one or more third transmissions using the third transmission power in one or more subsequent self-interference measurement occasions.

4. The method of claim 3, further comprising:
   performing a measurement process or mitigation process for the second type of self-interference based at least in part on transmitting the one or more third transmissions.

5. The method of claim 2, further comprising:
   transmitting a report comprising an indication of the detected second type of self-interference; and
   receiving configuration information for the third transmission power, wherein identifying the third transmission power is based at least in part on receiving the configuration information.

6. The method of claim 2, further comprising:
   determining the third transmission power; and
   transmitting an indication of the determined third transmission power.

7. The method of claim 6, further comprising:
   receiving an indication of a confirmation of the third transmission power, wherein identifying the third transmission power is based at least in part on receiving the indication of the confirmation of the third transmission power.

8. The method of claim 1, wherein
   receiving the signaling comprising the indication of the configuration for performing periodic self-interference measurements comprises:
   receiving configuration information comprising an indication of the first transmission power and the second transmission power.

9. The method of claim 1, wherein
   receiving the signaling comprising the indication of the configuration for performing periodic self-interference measurements comprises:
   determining at least the first transmission power or the second transmission power of the configuration for performing self-interference measurements.

10. The method of claim 9, further comprising:
    transmitting an indication of the determined first transmission power or second transmission power.

11. The method of claim 1, further comprising:
    identifying a common periodic self-interference measurement object for a set of self-interference measurement occasions, wherein the common periodic self-interference measurement object defines a common set of measurement parameters for the set of self-interference measurement occasions;

applying the common set of measurement parameters and a first transmission power configuration corresponding to the first transmission power for a first subset of the set of self-interference measurement occasions; and applying the common set of measurement parameters and a second transmission power configuration corresponding to the second transmission power for a second subset of the set of self-interference measurement occasions.

12. The method of claim 11, further comprising:
identifying an association between the first transmission power configuration and the first subset of the set of self-interference measurement occasions and an association between the second transmission power configuration and the second subset of the set of self-interference measurement occasions based at least in part on a bitmap.

13. The method of claim 11, further comprising:
identifying an association between the first transmission power configuration and the first subset of the set of self-interference measurement occasions and an association between the second transmission power configuration and the second subset of the set of self-interference measurement occasions based at least in part on a periodicity associated with the first subset and the second subset, or an offset between the first subset and the second subset, or a combination thereof.

14. The method of claim 11, further comprising:
transmitting a first report comprising a first measurement result corresponding to the first subset of the set of self-interference measurement occasions; and
transmitting a second report comprising a second measurement result corresponding to the second subset of the set of self-interference measurement occasions.

15. The method of claim 1, further comprising:
identifying a plurality of separate self-interference measurement objects for a set of self-interference measurement occasions, wherein each of the plurality of separate self-interference measurement objects defines a set of measurement parameters for one or more of the set of self-interference measurement occasions.

16. The method of claim 1, wherein the first repetition frequency is higher than the second repetition frequency.

17. The method of claim 1, wherein the first periodic transmission is for measuring a first type of the self-interference and the second periodic transmission is for measuring a second type of the self-interference.

18. The method of claim 17, wherein the first type of self-interference is associated with near-field self-interference, and the second type of self-interference is associated with reflection from an object.

19. The method of claim 1, wherein the first periodic transmission indicates signal strength of the wireless device.

20. The method of claim 1, wherein the wireless device is a user equipment (UE), a base station, a distributed unit, a mobile terminal, or an integrated access and backhaul node.

21. A method for wireless communications at a network node, comprising:
identifying a configuration for performing periodic self-interference measurement, wherein the configuration indicates a first transmission power associated with a first periodic transmission and a second transmission power associated with a second periodic transmission, wherein the second transmission power is higher than the first transmission power;
transmitting, to a wireless device, signaling comprising an indication of the configuration for performing periodic self-interference measurement, wherein the configuration indicates a first repetition frequency associated with the first periodic transmission and a second repetition frequency associated with the second periodic transmission, wherein the second repetition frequency is different from the first repetition frequency; and
receiving, from the wireless device, a measurement report comprising an indication of measured self-interference based at least in part on the configuration for performing periodic self-interference.

22. The method of claim 21, further comprising:
receiving, from the wireless device, a report comprising an indication of a detected second type of the self-interference; and
transmitting, to the wireless device, configuration information for a third transmission power.

23. The method of claim 22, further comprising:
transmitting, to the wireless device, an indication of the third transmission power.

24. The method of claim 23, further comprising:
receiving, from the wireless device, an indication of a confirmation of the third transmission power; and
identifying the third transmission power based at least in part on receiving the indication of the confirmation of the third transmission power.

25. The method of claim 21, wherein the indication of the configuration comprises a common self-interference measurement object for a set of self-interference measurement occasions, wherein the common self-interference measurement object defines a common set of measurement parameters for the set of self-interference measurement occasions.

26. The method of claim 25, further comprising:
receiving, from the wireless device, a first report comprising a first measurement result corresponding to a first subset of the set of self-interference measurement occasions; and
receiving, from the wireless device, a second report comprising a second measurement result corresponding to a second subset of the set of self-interference measurement occasions.

27. The method of claim 21, wherein the network node is a UE, a base station, a distributed unit, a central unit, a mobile terminal, or an integrated access and backhaul node.

28. An apparatus for wireless communications at a wireless device, comprising:
a processor,
memory coupled with the processor; and
instructions stored in the memory and executable by the processor to cause the apparatus to:
receive signaling comprising an indication of a configuration for performing periodic self-interference measurement, wherein the configuration indicates a first transmission power associated with a first periodic transmission and a second transmission power associated with a second periodic transmission, wherein the second transmission power is higher than the first transmission power;
transmit the first periodic transmission at the first transmission power and the second periodic transmission at the second transmission power, wherein the first periodic transmission is associated with a first repetition frequency and the second periodic transmission is associated with a second repetition frequency; and
measure self-interference based at least in part on transmitting the first periodic transmission and the second periodic transmission.

29. The apparatus of claim 28, wherein the instructions are further executable by the processor to cause the apparatus to:
- detect a second type of self-interference using the second periodic transmission transmitted with the second transmission power; and
- identify a third transmission power different than the second transmission power based at least in part on the detected second type of self-interference.

30. An apparatus for wireless communications at a network node, comprising:
- a processor,
- memory coupled with the processor; and
- instructions stored in the memory and executable by the processor to cause the apparatus to:
  - identify a configuration for performing periodic self-interference measurement, wherein the configuration indicates a first transmission power associated with a first periodic transmission and a second transmission power associated with a second periodic transmission, wherein the second transmission power is higher than the first transmission power;
  - transmit, to a wireless device, signaling comprising an indication of the configuration for performing periodic self-interference measurement, wherein the configuration indicates a first repetition frequency associated with the first periodic transmission and a second repetition frequency associated with the second periodic transmission, wherein the second repetition frequency is different from the first repetition frequency; and
  - receive, from the wireless device, a measurement report comprising an indication of measured self-interference based at least in part on the configuration for performing periodic self-interference.

\* \* \* \* \*